US011402542B2

(12) United States Patent
Rothenberg

(10) Patent No.: US 11,402,542 B2
(45) Date of Patent: Aug. 2, 2022

(54) FORECASTING METHOD WITH MACHINE LEARNING

(71) Applicant: The Tomorrow Companies Inc., Boston, MA (US)

(72) Inventor: Daniel Rothenberg, Boston, MA (US)

(73) Assignee: The Tomorrow Companies Inc., Boston, MA (US)

( * ) Notice: Subject to any disclaimer, the term of this patent is extended or adjusted under 35 U.S.C. 154(b) by 120 days.

(21) Appl. No.: 16/669,479

(22) Filed: Oct. 30, 2019

(65) Prior Publication Data

US 2020/0132884 A1 Apr. 30, 2020

Related U.S. Application Data

(63) Continuation-in-part of application No. 16/181,137, filed on Nov. 5, 2018, now Pat. No. 10,962,680, and a continuation-in-part of application No. 16/181,148, filed on Nov. 5, 2018, and a continuation of application No. PCT/US2018/067203, filed on Dec. 21, 2018.

(60) Provisional application No. 62/752,781, filed on Oct. 30, 2018.

(51) Int. Cl.
*G01W 1/10* (2006.01)
*G06N 20/00* (2019.01)
*G06N 5/04* (2006.01)

(52) U.S. Cl.
CPC .............. *G01W 1/10* (2013.01); *G06N 5/04* (2013.01); *G06N 20/00* (2019.01)

(58) Field of Classification Search
CPC ............ G01W 1/10; G06N 20/00; G06N 5/04
USPC .............................................................. 702/3
See application file for complete search history.

(56) References Cited

U.S. PATENT DOCUMENTS

| 4,218,755 | A  | * | 8/1980 | Root ....................... G01W 1/10 |
|---|---|---|---|---|
| | | | | 702/3 |
| 7,016,784 | B2 | | 5/2006 | Allen et al. |
| 9,613,269 | B2 | | 4/2017 | Kilty et al. |
| 2015/0253469 | A1 | | 9/2015 | Narayanaswamy et al. |
| 2016/0195856 | A1 | * | 7/2016 | Spero ..................... G06N 5/046 |
| | | | | 700/90 |
| 2017/0261646 | A1 | | 9/2017 | Liu et al. |
| 2018/0292573 | A1 | | 10/2018 | Cecelski et al. |
| 2018/0313975 | A1 | | 11/2018 | Chen |

OTHER PUBLICATIONS

Pinto, et al., "Advances in the Consolidated Storm Prediction for Aviation (CoSPA)," 14th Conference of Aviation, Range and Aerospace Meteorology American Meteorology Society, Atlanta, GA Jan. 18-21, 2010, p. 1-11.

(Continued)

*Primary Examiner* — Gertrude Arthur Jeanglaude
(74) *Attorney, Agent, or Firm* — Nixon & Vanderhye P.C.

(57) ABSTRACT

The systems and methods described herein provide a mechanism for collecting information from a diverse suite of sensors and systems, calculating the current precipitation, atmospheric water vapor, or precipitable water and other atmospheric-based phenomena based upon these sensor readings, and predicting future precipitation and atmospheric-based phenomena.

35 Claims, 20 Drawing Sheets

(56) References Cited

OTHER PUBLICATIONS

Casanova, et al., "On the Weighting of Multimodel Ensembles in Seasonal and Short-Range Weather Forecasting." Institute for Atmospheric and Environmental Sciences, Goethe-University Frankfurt, Frankfurt, Germany Monthly Weather Review 137, No. 11 (Nov. 1, 2009): 3811-22. https://doi.org/10.1175/2009MWR2893.1.

Monache, et al.; "Probabilistic Weather Prediction with an Analog Ensemble." American Meteorological Society 2013, Monthly Weather Review, vol. 141, pp. 3498-3516. https://doi.org/10.1175/MWR-D-12-00281.1.

DelSole, et al., "Is Unequal Weighting Significantly Better than Equal Weighting for Multi-Model Forecasting?" Quarterly Journal of the Royal Meteorological Society (Jan. 2013), pp. 176-183, vol. 139, Issue 670 https://doi.org/10.1002/qj.1961.

Kober, et al., "Blending a Probabilistic Nowcasting Method with a High-Resolution Numerical Weather Prediction Ensemble for Convective Precipitation Forecasts." Quarterly Journal of the Royal Meteorological Society vol. 138, Issue 664 (Apr. 2012) pp. 755-768. https://doi.org/10.1002/qj.939.

Wong, et al., "Towards the Blending of NWP with Nowcast—Operation Experience in B08FDP", WMO Symposium on Nowcasting (Jan. 2009), pp. 1-15. https://www.researchgate.net/publication/228811123_Towards_the_Blending_of_NWP_with_Nowcast-Operation_Experience_in_B08FDP.

Guan, et al., "Improvement of Statistical Postprocessing Using GEFS Reforecast Information." Weather and Forecasting, vol. 30, No. 4 (Aug. 1, 2015); pp. 841-854 https://doi.org/10.1175/WAF-D-14-00126.1.

Radhadkrishna, et al., Post-Processing Model Predicted Rainfall Fields in the Spectral Domain Using Phase Information from Radar Observations; J. Atmos. Sci. (2013) vol. 70 (No. 4): pp. 1145-1159 https://doi.org/10.1175/JAS-D-12-0175.1.

Atencia, et al., "Improving QPF by Blending Techniques at the Meteorological Service of Catalonia." Natural Hazards and Earth System Sciences vol. 10, No. 7 (Jul. 7, 2010): 1443-55. https://doi.org/10.5194/nhess-10-1443-2010.

\* cited by examiner

FIGURE 15 – Forecast Blending

FIGURE 17 – Storm Curve Selection

FIGURE 19 – NWP Collected Data Bias Correction

FORECASTING METHOD WITH MACHINE LEARNING

1 CROSS REFERENCE TO RELATED U.S. PATENT APPLICATIONS

The present application claims priority under 35 U.S.C. § 119(e) from provisional U.S. Patent Application Ser. No. 62/752,781 filed Oct. 30, 2018, which is incorporated herein by reference in its entirety and for all purposes.

The present application is related to U.S. patent application Ser. No. 16/102659 filed Aug. 13, 2018, which is incorporated herein by reference in its entirety and for all purposes.

The present application claims priority under 35 U.S.C. § 119(e) from PCT International Patent Application No. PCT/US2018/067203 filed Dec, 21, 2018 and published on 27 Jun. 2019, which claims priority from U.S. patent application Ser. No. 16/181,148 filed Nov. 5, 2018; U.S. patent application Ser. No. 16/181,137 filed Nov. 5, 2018; and U.S. Provisional Patent Application No. 62/609,096 filed Dec. 21, 2017, all of which are incorporated herein by reference in their entirety and for all purposes.

2 COPYRIGHT NOTICE

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2019, ClimaCell, Inc.

3 FIELD

The exemplary, illustrative, technology herein relates to systems, software, and methods for the determination of current weather phenomena and the generation of accurate weather and precipitation forecasts, including analysis and prediction of weather based on real-time, high frequency, and historical sensor reading and weather events. The technology herein has applications in the area of weather forecasting.

BACKGROUND AND SUMMARY

The known art that includes various methods for processing radar reflectivity data to identify and track storms and storm objects are used for automatic storm identification and classification, storm tracking, and determining motion fields based on sequential radar images. Some known methods classify storms using classifications such as stratiform rain region, developing storm, convective cell, cluster of convective storms, thunder storm, moderate storm, and long duration storm. These classifications are inadequate for generating high speed forecasts based upon the storm information.

Some known methods determine motion fields, which are arrays of motion vectors that describe the motion individual objects depicted in the radar images, such as regions defined by threshold reflectivity intensity or identified storm objects. Motion fields are used to predict the location and starting time of severe weather and to study the mechanics of storm evolution. Motion fields and velocity vectors are used as inputs for radar-based nowcasting, where storm objects or regions are shifted in the forecast using a motion field or using object and region velocities at forecast time points. Radar-based nowcasting does not completely account for growth and decay of radar echoes and corresponding growth and decay in storm intensity, and may result in errors in extracted motion vectors and calculated precipitation estimates.

Radar-based storm tracking and surface precipitation estimates may have significant inaccuracy since the accuracy of the weather radar return diminishes as the distance from the radar station increases. Weather radar signals attenuate when passing through precipitation, so the storm objects, motion data, and precipitation maps derived from weather radar have known limitations related to signal attenuation due to their inherent bias to underreport precipitation. Thus, radar-based precipitation estimates are inadequate to completely describe measure surface rainfall.

The system of U.S. patent application Ser. No. 16/102,659 includes improvements over radar-based nowcasting that utilize precipitation estimates derived from external sources (e.g. terrestrial wireless network data sources, satellite network data sources, and weather sensor data sources) in order to improve the speed and accuracy of aspects of radar-based forecasting. However, there still remain challenges with predicting how storms will track and mature, limiting the effectiveness of longer term and rapidly produced forecasts.

Taken together, these challenges mean that existing systems fail from an information handling perspective in their ability to provide real-time forecasts of weather parameters.

The systems and methods described herein provide a mechanism for collecting information from a diverse suite of sensors and systems, calculating the current precipitation, atmospheric water vapor, or precipitable water and other atmospheric-based phenomena based upon these sensor readings, and predicting future precipitation and atmospheric-based phenomena.

4 BRIEF DESCRIPTION OF THE DRAWINGS

The features of the present technology will best be understood from a detailed description of example non-limiting embodiments selected for the purposes of illustration and shown in the accompanying drawings in which.

5 DESCRIPTION OF SOME EXAMPLE NON-LIMITING EMBODIMENTS

5.1 Overview

Figure 1:
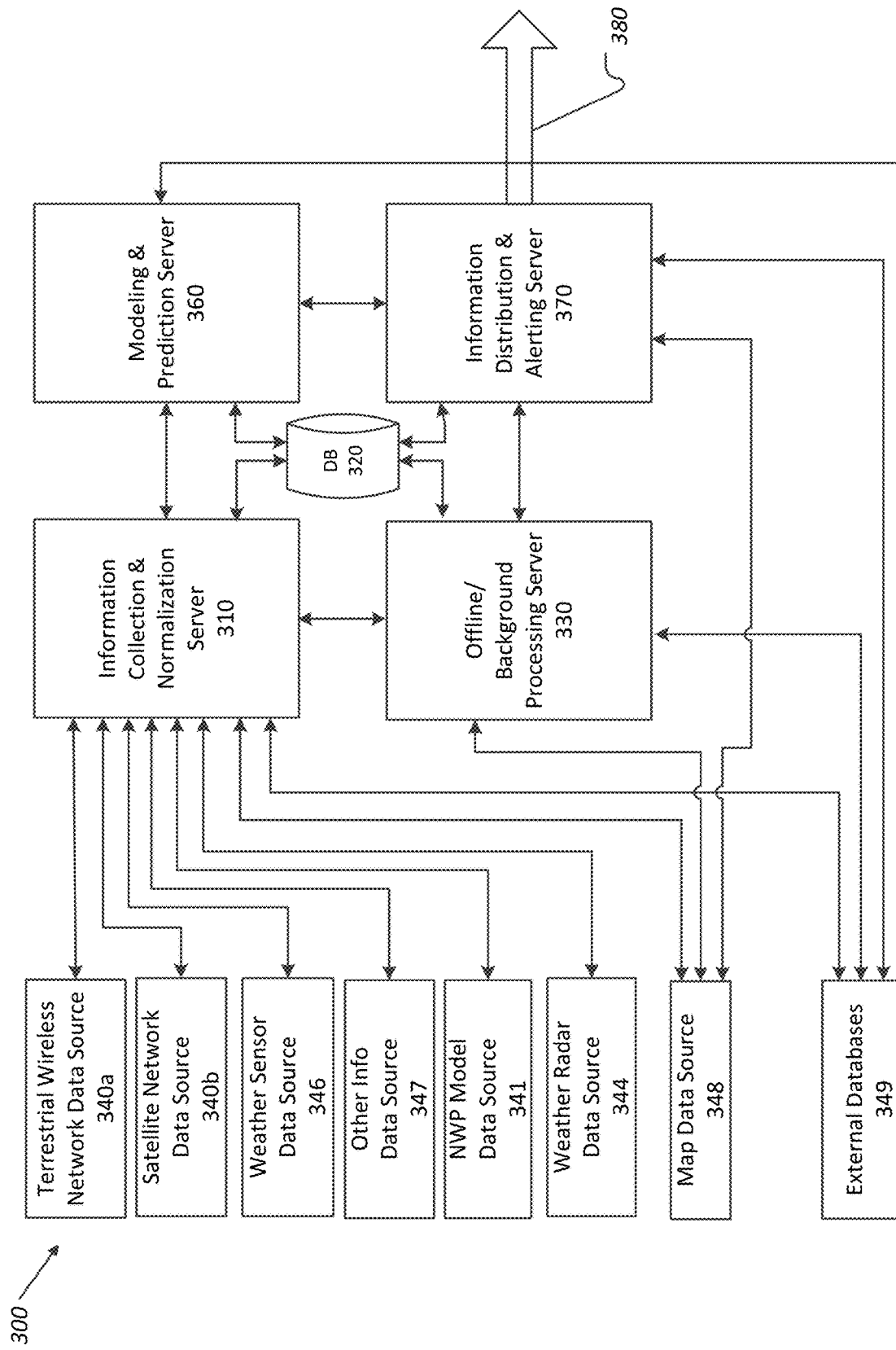
FIG. 1 depicts an exemplary systems diagram of a computing apparatus supporting aspects of the described system, according to an illustrative embodiment.

The systems and methods described herein provide a mechanism for collecting information from a diverse suite of sensors and systems, calculating the current precipitation, atmospheric water vapor, or precipitable water and other atmospheric-based phenomena based upon these sensor readings, and improving forecasts of future weather information including humidity, precipitation, storm movement, and other atmospheric-based phenomena.

"Real time" meteorology equipment, such as weather radar, provides precipitation maps showing precipitation intensities and locations on a short time interval, e.g., less than a fifteen minute interval, or optionally less than a five minute interval, or optionally a one minute interval or thereabouts. Diverse meteorological phenomena have diverse temporal evolution (e.g., humidity changes much more slowly than does precipitation intensity). Accordingly the definition of "real time" or "most current data" may depend on the meteorological phenomena being measured and reported.

The example non-limiting system architecture has one or more (e.g., four) servers (e.g., including data processing components), based in part upon its function and the nature of the information being processed. A first server (including a data processing component) is an information collection and normalization component; a second server (including a data processing component) is an offline/background processing component; a third server (including a data processing component) is a modeling and prediction component; and a fourth server (including a data processing component), is an information distribution and alerting component.

The described system includes techniques for improving the accuracy and timeliness of forecasts, and for data management of storm data that improves accuracy and timeliness of forecasts. New techniques for managing ensembles of forecasts are disclosed, as are several techniques are described that improve existing NowCast forecast methods, including creating blended forecasts optimized for forecast skill by blending several forecast models with differing forecast skill curves, improving storm type modeling, (and its related storm intensity growth and decay parameters), and using machine learning techniques to improve storm track, type, and weather phenomena prediction.

The improved forecasting methods of the system as described provide significant improvements in the accuracy of the forecast algorithms and processing throughput, resulting in improvements in accuracy and timeliness of the forecasts generated and weather information provided by the system.

These and other aspects and advantages will become apparent when the Description below is read in conjunction with the accompanying Drawings.

5.2 Definitions

The following definitions are used throughout, unless specifically indicated otherwise:

| TERM | DEFINITION |
|---|---|
| Real-time | Has definition consistent with that provided in European Patent Application Serial No. WO2019126707A1 |
| Cadence instance/cadence instance data structure | Has definition consistent with that provided in European Patent Application Serial No. WO2019126707A1 |
| Cadence series | Representation of data collection of processing for a cadence cycle iteration. A cadence instance may be a member of more than one cadence series. A cadence series is a set of cadence instances, |
| Tile layer | Have definitions consistent with that provided in European |
| Tile stack | Patent Application Serial No. WO2019126707A1 |
| Collection Data tile stack | |
| Forecast tile stack | |
| Post forecast processing tile stack | |
| Weather product tile stack | |
| Data source | Have definitions consistent with that provided in European |
| Collected data | Patent Application Serial No. WO2019126707A1 |
| Generated collected data | Collected data further includes information collected from |
| Processed collected data | data sources including, for example, radar images, numerical |
| Generated data | weather prediction (NWP) model data (including NWP |
| Weather parameter data | forecast ensembles), and external forecast sources. |

-continued

| TERM | DEFINITION |
| --- | --- |
| Historical weather parameter data<br>Forecast generated data<br>Processed data<br>Post-processed data | Processed collected data includes, for example, HRRR data, and includes ensemble member forecast data and ensemble forecast data; radar processed data including radar reflectivity data; map processed data; and other info processed data<br>Generated collected data includes new data derived, calculated from, or interpolated from collected data or processed collected data. Generated collected data additionally includes storm objects data and storm motion data extracted from radar data.<br>Processed data further includes forecast generated data blended with processed data, for example nowcast data blended with NWP forecast data.<br>Post-processed data includes is historical storm data and storm intensity profile data that is derived from storm object data and motion vector data and saved to a historical storm database.<br>Historical weather parameter data is weather parameter data associated with a past cadence instance. |
| Nowcast | A short term, high resolution and high update frequency forecast. |
| Forecast element | A data component of a forecast. |
| Forecast set | A set of related forecasts, represented within a cadence instance as $M_iF_{(type)}$ [j = 0, forecast cycles]. Forecast sets can be of a specific type (e.g. ensemble, bias corrected ensemble, NWF). |
| Forecast error | Generically - the difference between actual (ground truth) and forecast values for weather parameters ($M_iF_j$ vs. $M_{i\text{-}collected}$, or ($M_iF_j$ vs. $M_{[k=i,\ i+j]\text{-}actual\ collected}$). |
| Forecast error, immediate | The difference between collected weather data and forecast weather data for the current cadence cycle/time interval ($M_iF_0$ vs. Mi actual collected). |
| Forecast error, cumulative | The set of immediate forecast errors for a particular forecast, e.g. the set of forecasts $M_iF_{[j=0\text{-}forecast\ cycles]}$ and $M_{i\ actual\ collected}$) |
| Allowable forecast error<br>Cumulative allowable forecast error | Defined or calculated metric associated with a forecast element for magnitude of forecast error (e.g. absolute, %, relative %) associated with a specific forecast. The cumulative allowable forecast error is the summation of all of the allowable forecast errors for a forecast set (of forecasts). Allowable and cumulative allowable forecast errors are specific to the forecast element type and the forecast type (e.g. differing forecast types may have differing allowable error types and values). |
| Forecast skill | A hindsight metric of forecast quality. A forecast skill metric value is expressed as function of a forecast's success is correctly predicting events, as a relative representation comparing forecast performance to a benchmark performance such as persistence (i.e. initial conditions propagated to all forecast time points unchanged), or as a generalization of normalized accuracy metrics {e.g. Mean Absolute Error of a forecast field versus collected data). Forecast skill is conventionally expressed as a range of 0 to 1 or −1 to 1 where, in both cases, a perfect forecast will have a skill metric value of 1. Forecast skill typically decreases with successive forecast time points following a skill curve that is calculated for a particular forecast model using hindcasting. |
| Forecast skill, immediate | A metric of forecast quality, computed using forecast error, immediate values. |
| Forecast skill, cumulative | A single metric computed from the set (forecast error, cumulative) that summarizes the set of immediate forecast errors (or the set of forecast skill, immediate). |
| Bias | The systemic error produced by a forecast model, e.g. a forecast that forecasts too little rain, or too much rain, or storm tracks that are consistently too slow. Bias is determinable after several sets of forecasts and related forecast errors are determined, and then only after other types of errors are removed (e.g. ensemble selection) |
| Bias-corrected forecast | A forecast that has been processed, using, for example, collected or generated collected data, to correct, remove, or reduce one or more types of forecast bias, e.g. phase, amplitude, positional, areal, and intensity. |
| CAPE | An acronym for Convective Available Potential Energy. |

5.3 Exemplary System Architecture

An illustrative, non-limiting, computing system that implements aspects of the technology(ies) is structured with plural (e.g., four) general processing components (i.e., servers), based in part upon the nature of the information being processed, and the manner in which the information is processed in order to enable near real-time determination of the nature of weather conditions of a geographic region and to forecast weather conditions over the geographic region. As described above, the logical processing components of the system may comprise, in one non-limiting embodiment, an Information collection and data pre-processing component, an Offline/background processing component, a Modeling and prediction component, and an Information distribution and alerting component. This functional organization of components is provided for illustrative purposes; it is contemplated that other functional organizations may be implemented using the techniques described herein. Other components of the example system further comprise one or more external data sources, a system database, and external databases.

The components function at various stages of the cadence processing cycle in order to produce improved forecasts. In review, a cadence cycle processing can be categorized into the following processing stages:

Data collection/pre-processing stage (performed during data collection)

post-collection processing stage (performed at the completion of data collection)

Forecast generation stage, including the substages of (a) pre-forecast processing, (b) pre-forecast cycle processing, (c) forecast cycle processing, (d) post forecast cycle processing Post forecast processing stage (performed after a forecast set is completed)

Weather product generation stage

Offline/background processing stage (performed asynchronously)

Different programs are executed at different stages as controlled by the configuration of a cadence manager. The cadence subsystem (including cadence manager) of the precipitation modeling and forecasting system (300) is more fully described in European Patent Application Serial No. WO201912707A1 and U.S. patent application Ser. No. 16/102,659, including the terms and data structures.

The cadence manager (905) is a program that is part of a cadence subsystem that manages the data processing related to cadence instance processing, including the organization and sequencing of the processing stages and executing any necessary specified propagation and processing programs. The additional programs and functionality described herein are configured for use by the cadence manager by the cadence manager configuration and are executed by the cadence manager in order to further process the collected and forecast data as described.

The cadence manager implements the processing stages described above in accordance with its configuration. Thus, a specific program may be configured to be executed as part of the Post-collection processing stage in a first exemplary configuration of the system, while the same program may be configured to be executed as part of a different stage in a second exemplary configuration of the system. Dependencies between stages and tile layers are also represented in the configuration of the cadence manager. When a program is identified in an example as executing on a specific server, or as part of a particular processing stage, the actual control of when and where a program executes is in accordance with the configuration of the cadence manager.

The cadence manager starts by processing the data collection/pre-processing stage. The results of this stage results in the collected data being written to the system database and some post-collection processing (e.g. normalization, dedup) being performed.

Once the cadence collection interval expires, the cadence manager starts the post-collection processing stage. In this stage, the collected data is further processed to produce the initial data for the cadence instance. Several of the described programs (e.g. storm tracking) are typically configured to execute during the post-collection processing stage.

Once the post-collection processing stage is complete, the system then starts to process the forecasting stage, starting with the forecast pre-processing stage. The forecast pre-processing stage executes the configured forecast pre-processing programs in a configuration dependent order. These programs may be sequenced by system configuration so that dependencies are honored and parallel processing pipelines are correctly configured. The pre-processing stage reads information stored in the current cadence instance's $F_0$ tile stack and, optionally, collected information for the current cadence instances or collection or forecast generated data of prior cadence instances, performs calculations that produce new data as a result of those calculations, and writes the resulting data to a data type specific database in order to create a new data type tile layer of the $F_0$ tile stack.

The forecast generation stage (or one of the substages) is typically configured to perform bias correction processing. Generally, these configurations involve selecting and executing one more configured bias correction program(s) in order to correct bias of a previously collected or calculated forecasts using one or more of collected, processed collected, generated collected, and forecast generated weather parameter data from the current or past cadence cycle. In one exemplary embodiment, the cadence manager executes a program that updates the $M_{i-1}$ forecast based on $M_i$ processed collected data, for example by executing a bias correction program to bias-correct the $M_{i-1}$ forecast or determining the forecast skill of the forecast is sufficiently high to permit the system to use $M_{i-1}$ forecast data for $M_i$ by copying the $M_{i-1}$ forecast data to $M_i$ forecast tile layers or updating the tags on $M_i$ forecast tile layers to reference corresponding $M_{i-1}$ forecast tile layers.

The forecast generation stage (and its substages) is typically configured to select and execute a forecast blending program in order to combine two or more ensemble member forecasts to generate ensemble forecasts, and to conduct other forecast blending activities.

The cadence manager configuration supports conditional program execution through the use of forecast metrics such as skill, and controls various programs defined in the cadence manager configuration on the basis of comparing forecast metrics against one or more thresholds and/or allowable error values. In an exemplary embodiment, the cadence manager causes the forecast skill of a previously generated (e.g., $M_{i-1}$) forecast to be calculated (e.g., by executing a forecast skill calculation program (676)), and then compares the calculated skill of the previously generated forecast to a configuration forecast initiation threshold value that represents a minimum forecast skill level below which a previously calculated forecast should be replaced. If the forecast skill level is below the forecast initiation threshold value, the cadence manager determines a new forecast instance should be initiated using data collected during a current cadence instance. If so, the cadence manager executes a forecasting program (e.g., precipitation forecasting program (931)) to initiate a new forecast. If the cadence manager determines that a new forecast will not be initiated, the cadence manager maintains (or executes a program to copies and/or update) the previously generated forecast data from a previously initiated forecast as the current forecast, and optionally blends the previously initiated forecast with current collected data to produce the current forecast. In this manner, the system "steals" a previously initiated forecast, thereby reducing the number of new forecasts that are initiated.

A notification may be sent when a program or stage completes. These notifications permit the system to start the next process in a processing pipeline, or to transition to a new processing stage (e.g. transitioning from forecast pre-processing to forecast generation stages).

The post-forecast generation stage is typically used to clean up one or more forecasts and to coordinate with external programs that use the forecast information produced by the system.

The weather products generation stage is typically used to produce one or more weather products based upon completed forecast information. For example, an improved NowCast for a specific location is generated by the information distribution server using one or more blended weather parameter forecasts.

The offline/background processing stage is typically used to schedule housekeeping and intermittently performed processes that are independent of the cadence cycle. One example of such processes are those related to building historical archives of weather and forecast data, and for "garbage collection" activities where obsolete or deleted data is removed from the system. In an exemplary use, the cadence manager executes programs that coordinate and perform a plurality of actions to tear down and archive old forecasts as part of post processing stages, for example forecasts that have been superseded by new or updated forecasts and forecasts that are otherwise stale, e.g. forecasts with a last forecast time point that is equal to or that preceded a current time. Typically, these programs are executed by the offline/background server.

In an alternative exemplary embodiment, a cadence manager determines that one or more particular forecast(s) should be archived, and executes one or more configured programs on the basis of its configuration to select and archive specific forecasts. These programs include the historical storm update program (660); forecast skill calculation program (676); and forecast archive program (668) to calculate metrics related to the forecasts and then archive the forecasts and historical storm information.

The functions of the servers hosting each of the components may be combined into fewer servers, or expanded so that there is any number of physical servers without deviating from the described system. FIG. 1 illustrates, by example, an example of an improved precipitation modeling and forecasting system (300) comprising four computing servers (310, 330, 360, and 370) performing the data processing tasks appropriate to the server architecture, with each server operating as a different one of the logical processing components. The servers share information directly, or through a system database (320), or external databases (349).

Each of the four computing servers (310, 330, 360, and 370) has access to external data sources (340-348) and internal or system data sources from the system database (320) or from databases operating on one or more of the four servers as is required to perform the necessary data collecting, data clean up and pre-processing, precipitation modeling, forecast modeling, or the like. Input and output data are processed and modeled in real time, in a time delayed mode, and in batch mode, respectively, either simultaneously or asynchronously, and shared between system components on various servers using network communications, notifications, messages, common storage, or other means in common use for such purposes. The described architecture segregates programs and processes that have different attributes, including the programs and processes that are periodically performed on a scheduled routine or basis, batch collection and loading of data, computation intensive and parallel processing modeling, and user interface, onto separate servers for purposes of clarity of presentation. Alternatively or in addition, other processing arrangements may be used to implement the system.

According to the described technology, each exemplary server may be implemented as an individual computer system, a collection of computer systems, a collection of processors, or the like, either tightly or loosely clustered, a set of interacting computer systems that are not clustered, or other arrangement as deemed appropriate by those with skill in the art. Computer systems can be implemented using virtual or physical deployments, or by using a combination of these means. In some implementations, the servers may be physically located together, or they may be distributed in remote locations, such as in shared hosting facilities or in virtualized facilities (e.g., "the cloud").

Figure 2:
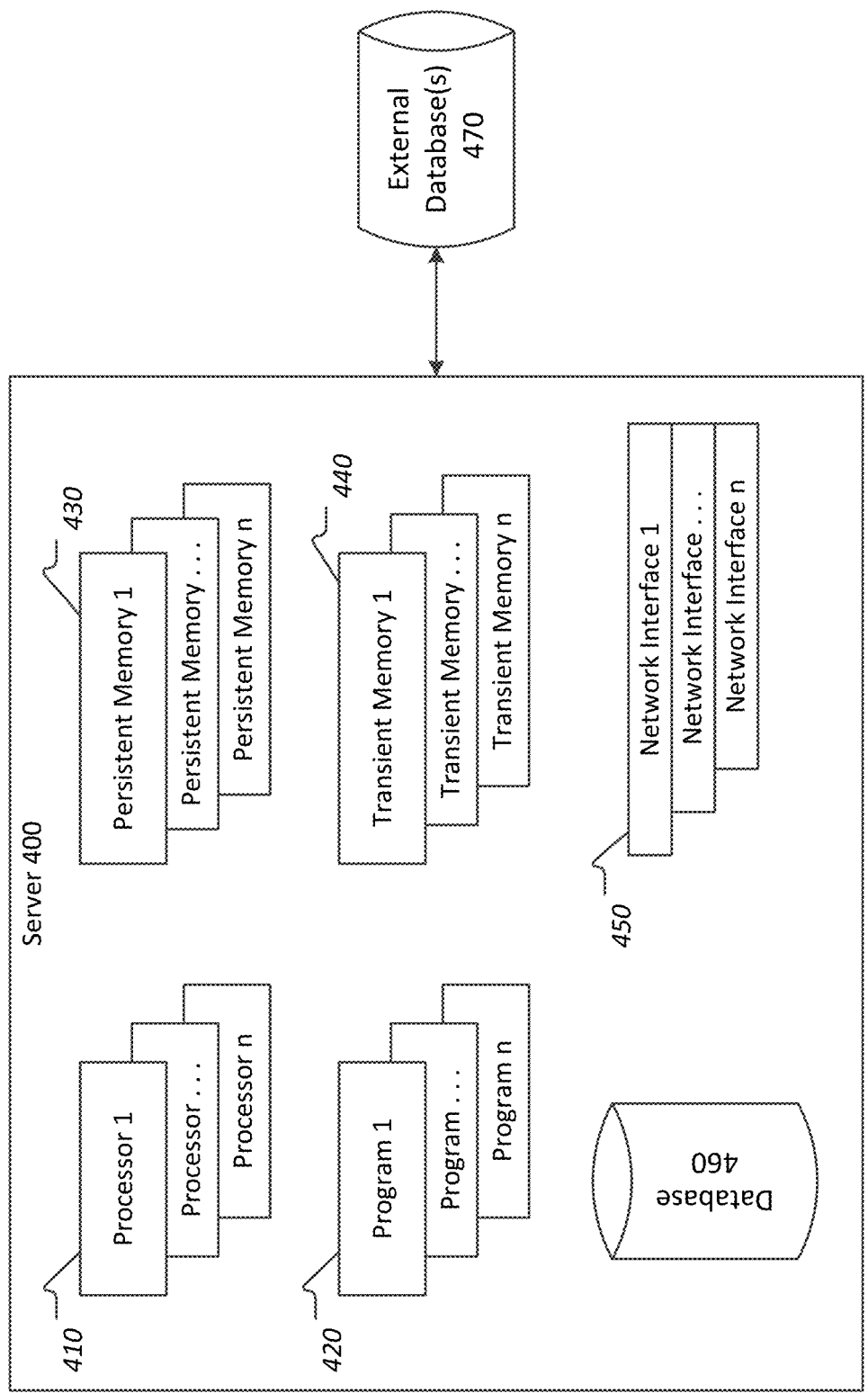
FIG. 2 depicts an illustrative exemplary computer server that supports the described system, according to an illustrative embodiment.

An exemplary computer server (400) is illustrated in FIG. 2. Each exemplary server comprises one or more processors or data processing components (410), operably connected to memories of both persistent non-transitory (430) and/or transient non-transitory (440) nature that are used to store information being processed by the system and to additionally store various program instructions (collectively referred to herein as "programs") (420) that are loaded and executed by the processors in order to perform the process operations described herein. Each of the processors is further operably connected to networking and communications interfaces (450) appropriate to the deployed configuration. Stored within persistent memories of the system may be one or more databases used for the storage of information collected and/or calculated by the servers and read, processed, and written by the processors under control of the program(s). Database 460 is an internal instance of at least a portion of the system database (320). A server may also be operably connected to an external database (470) via one or more network or other interfaces. The external database may be an instance of the system database that is provided on another server, or may be a network connected database that is a commercial or other external source (349).

5.3.1 Information Collection and Normalization Server (310)

Referring again to FIG. 1, the first server (including a data processing component) is an information collection and normalization component (310) that interacts with external data sources (340-348) and collects relevant information from these sources for use by the precipitation modeling and forecasting system (300). The information collection and normalization server error-corrects, reduces redundancy, and normalizes information collected from the data sources. The information collection and normalization server processor(s) execute also data collection programs (e.g., 420 of FIG. 2) that apply data type specific pre-calculated filters to collected information to remove data that is extraneous, erroneous, distorted, or otherwise unreliable in order to improve accuracy of the processed results.

The data collection programs are stored in or executed in transient or persistent memory (e.g., 430 or 440 of FIG. 2), and carry out processing required on data stored in or executed in transient or persistent memory and/or system database (320). Data located in a persistent memory or a system database are said to be in a data store of the described system.

The information collection and normalization server stores the collected information into one or more databases in forms associated with cadence cycle tile layers in order to make it available to the other components of the system. The stored data is formatted in a manner that allows more efficient further processing of the stored data and provision of a more accurate forecasts.

The information collection normalization server programs have been extended to include additional forecast collection, such as NWP forecasts and forecast ensembles, to pre-process radar reflectivity data in support of determining the storm objects present in the radar images, and similar activities. The programs executed on the information collection and normalization server are defined in the cadence configuration, even if they are presented in the example embodiments as residing on a specific (perhaps differing) server.

5.3.2 Offline/Background Processing Server (330)

Figure 3:
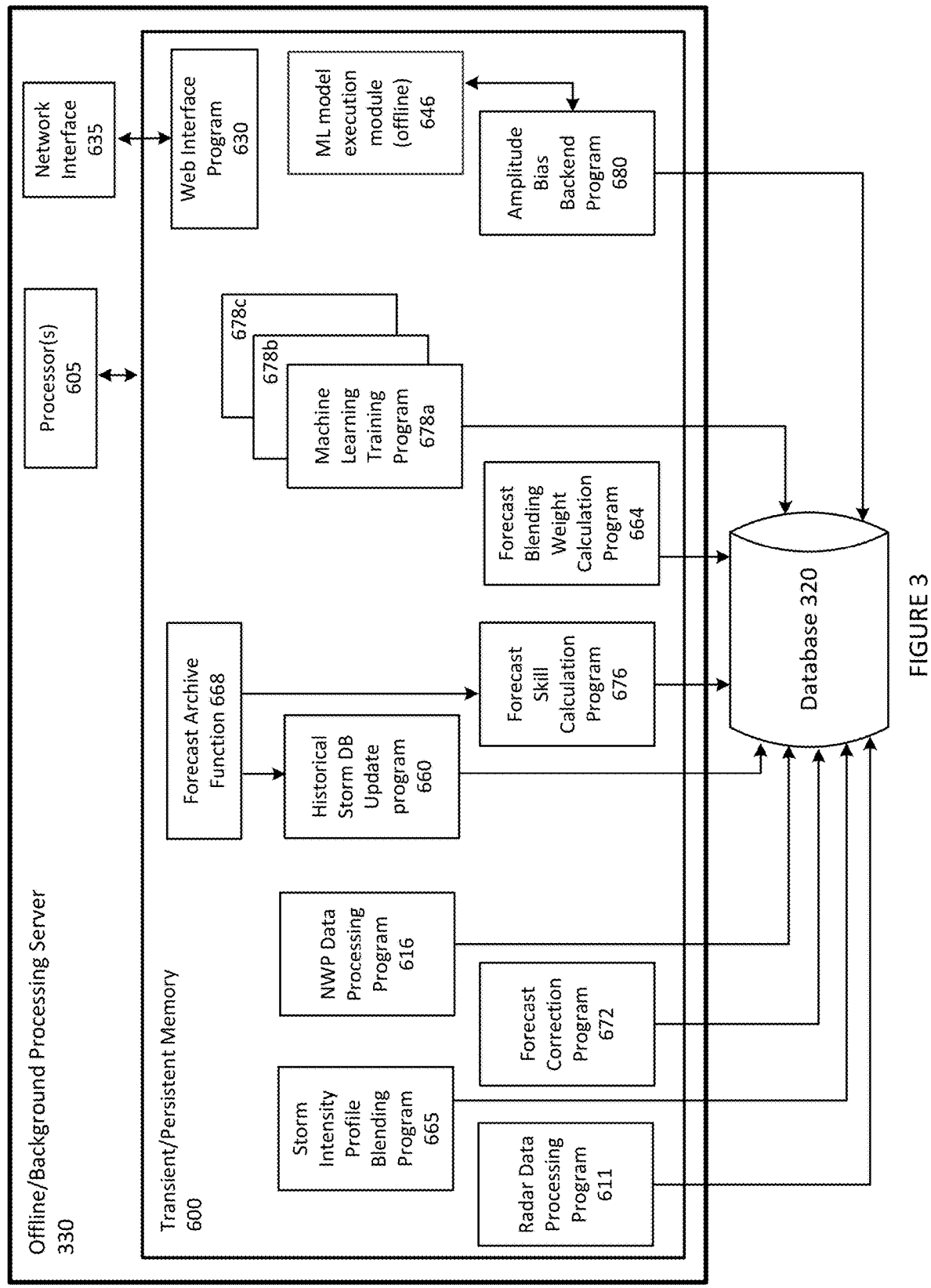
FIG. 3 depicts an illustrative offline/background processing server of the described system, according to an illustrative embodiment.

Continuing to refer to FIG. 1, a second server (including a data processing component) is an offline/background processing component that retrieves updates from the information collection and normalization server (310), from the system database (320), and from external databases (349) and processes that data to generate processed collected data. The offline/background processing server (330), as illustrated in FIG. 3, comprises one or more computer systems similar to the exemplary server illustrated in FIG. 2. The server executes programs (e.g., programs 611, 616, 660, 664, 665, 668, 672, 676, 678, 680) to generate transforms, time series rules, and trained predictive models that other servers implement to calculate and forecast weather data. These programs are executed in accordance with the cadence configuration. Processing is carried out by one or more processors (605). The programs are stored in or executed in transient or persistent memory (600). The data generated by these executing programs are written back to the system database and are shared with the other servers in the system either directly or through the database. The offline/background processing server further supports one or more web interface programs (630) for providing server management information utilizing a network interface (635) or other dedicated management information reporting systems.

The offline/background processing server typically executes a series of background and scheduled programs that recalculate and/or update information related to the precipitation, fog and the underlying reference tables that these models rely upon. The server performs non-time critical processing of collected information, non-time critical updating of low-temporal resolution calculations and modeling, and periodic processing to update longer term models. The offline/background processing server also pre-calculates and updates pre-calculated transforms for translating collected information into alternative formats (such as tile layers) usable by other servers and programs of the system; the process of generating transforms is discussed in European Patent Application Serial No. WO2019126707A1. The offline/background processing server also pre-calculates filters that are used to exclude erroneous data points and to reduce data volumes that are saved to databases.

The offline/background processing server (330) further comprises programs that are configured to train, validate, update, and execute machine learning (ML) trained models and algorithms. The ML components of the system and their operation are described more fully in European Patent Application Serial No. WO2019126707A1. In some exemplary embodiments the offline/background processing server (330), includes one or more instances of offline ML model execution program (646) or one or more programs that each include an instance of the offline ML model execution program.

5.3.3 Modeling and Prediction Server (360)

Also referring to FIG. 1, a third server (including a data processing component) is a modeling and prediction component that performs parallel computations for preparing a precipitation forecast that at least indicates a precipitation type and a precipitation intensity at various locations and is preferably further based on other weather phenomena. The server (360) retrieves weather parameter data, including processed collected data and generated collected data, from the system database (320) and from other sources of processed data provided by the other servers of the precipitation modeling and forecasting system. Information obtained from the system database includes any forecast generated data that was previously processed. The modeling and prediction server executes one or more programs to perform various complex and processor intensive modeling and prediction algorithms and data manipulations used to prepare a one or more precipitation forecasts which may be projected onto geographic maps. These programs are executed in accordance with the cadence configuration. The resulting forecast generated data are written back to the system databases for later use and for sharing with the other servers of the precipitation modeling and forecasting system. The modeling and prediction server also implements the cadence manager, which controls the operation of the cadence-based programs. Alternatively, one or more of the newly generated forecast generated data are sent directly to the information distribution and alerting server (370) for use in notifying a user.

Figure 4:
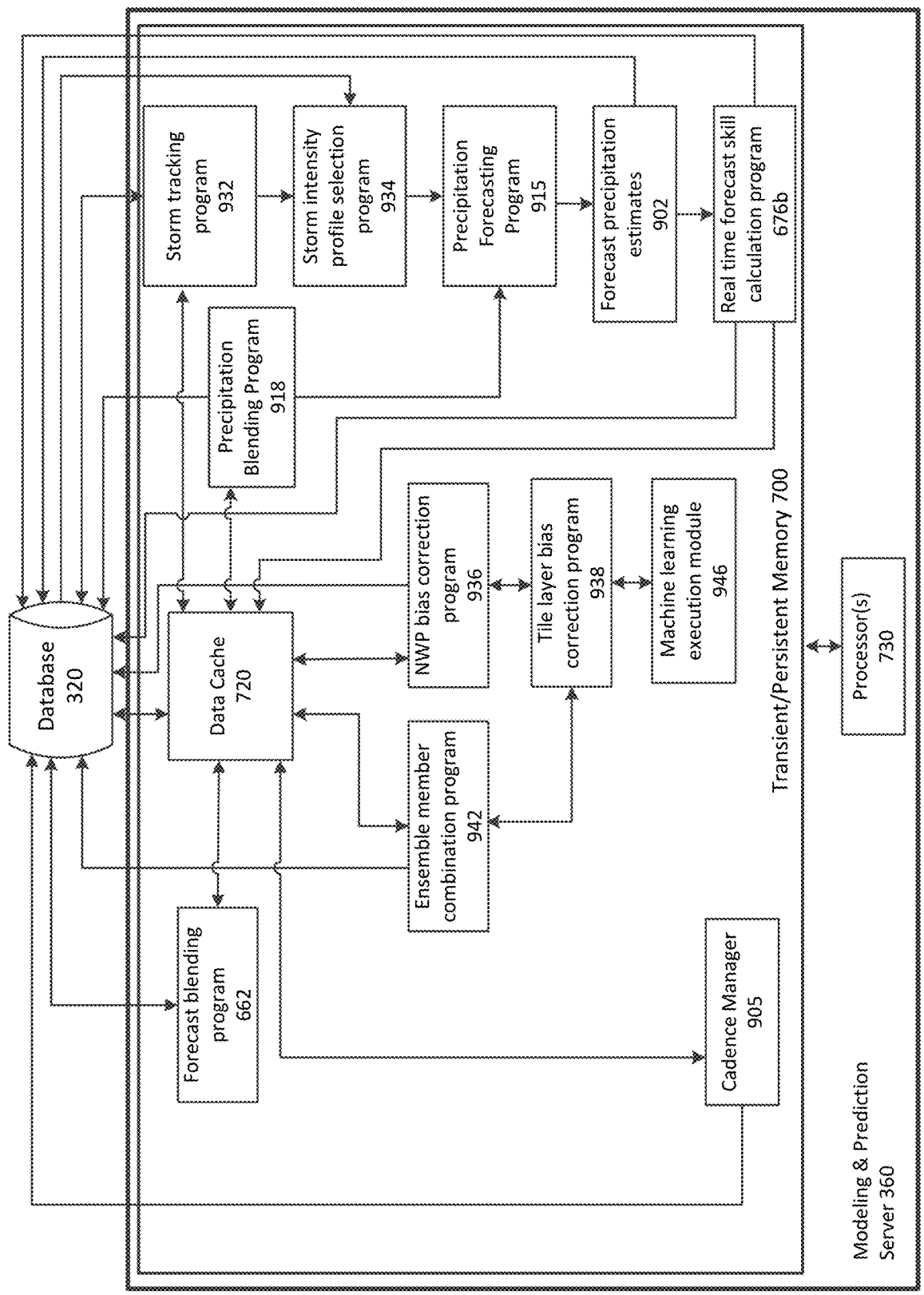
FIG. 4 depicts an illustrative modeling and prediction server of the described system, according to an illustrative embodiment.

The modeling and prediction server, as illustrated in FIG. 4, comprises one or more computer systems similar to the exemplary server illustrated in FIG. 2. This server comprises one or more processors (730), and programs (662, 676, 905, 915, 918, 932, 934, 936, 938, 946) that are stored and executed from transient or persistent memory (700). In general, weather forecasting programs collect information previously stored in one or more of the system databases and forecast weather conditions such as precipitation or fog at one or more future time points. The server programs read information from system database (320) including one or more logical databases listed in Table 1, comprising weather data that are part of the system database as required, and can be cached (720) in one or more transient or persistent memories (700) for use by programs that carry out real-time modeling and/or prediction processing. Processing results are written as updates to, or as new information for one or more logical databases containing generated data, collected data, or weather parameter data (e.g., 322), storm objects and motion vectors (350), and precipitation or other weather parameter forecasts (e.g., 325). The modeling and prediction server processes collected data to create generated collected data, for example radar precipitation data calculated from radar reflectivity data, saved to radar database (322).

The modeling and prediction server (360) further comprises an online ML model execution program (946) that executes one or more trained ML models using ML model input data to generate ML model output data (e.g. predictions, estimates, or forecasts). The ML model execution program includes a configuration setting that specifies a particular ML model or type of ML model for the execution program to retrieve and execute.

5.3.4 Information Distribution and Alerting Server (370)

Also referring to FIG. 1, a fourth server (including a data processing component), is an information distribution and alerting component (370) that retrieves information from the system database (320), or directly from the modeling and prediction server (360), and processes the data received therefrom to produce one or more weather products. In particular, the server produces and distributes one or more weather products (NowCast forecasts, weather-based reports) based upon weather parameter data, forecast data, and blended forecast data. The information distribution and alerting server is more fully described in European Patent Application Serial No. WO2019126707A1.

5.3.5 System Database (320)

The system database (320), as depicted in FIG. 1, includes one or more individual databases (e.g. stored on each of the servers of the precipitation modeling and forecasting system (300)), and/or may include a centralized database server, including one or more logical databases. Individual databases of the system identified throughout this document are part of the system database. Additional individual logical databases defined in this specification are listed in Table 1 below and may be omitted from the drawings for clarity.

Refresh (HRRR) model and ensemble forecasts generated by the Global Ensemble Forecast System (GEFS). In a first exemplary embodiment, the NWP data processing program saves NWP forecast data sets provided by a NWP data source associated with a current cadence $M_i$ collection time stamp, to one or more tile stacks of $M_iF_j$ forecast tile layers with j ranging from 1 to n, where n represents the number of NWP forecast time points for which forecast data was collected. The plurality of tile stacks may be referenced as $M_iF_{j,(ensemble)}$, where (ensemble) may be an index or an ensemble name. Alternatively, in a second exemplary embodiment, the NWP data processing program saves collected NWP forecasts corresponding to future NWP forecast time points to a series of $M_i$ collected data tile layers where Mi iterates from 1 to n and where each $M_i$ collection time stamp corresponds to a NWP forecast time point. In both exemplary cases, the NWP data processing program saves the collected NWP data to NWP model database (329). In some exemplary embodiments, the NWP data processing program processes and saves an ensemble forecast that was collected from an NWP data source. In these exemplary embodiments, the NWP data processing program processed each individual ensemble member as a NWP forecast data set, as described above, tags each forecast as an ensemble member of the overall ensemble, and saves the individual ensemble member forecast tile stacks to ensemble member database (362).

5.4.2 Forecast Skill Calculation Program (676)

A forecast skill calculation program (676) is a program that compares a previous forecast with the actual collected

TABLE 1

Logical Databases (within System Database)

| Number | Name | Description |
|---|---|---|
| 350 | Storm objects database | Contains storm object data and storm motion data generated from collected data, for example storm objects and motion vectors generated from radar reflectivity data or radar precipitation data by storm tracking program (932) |
| 351 | Historical storm database | Contains storm object and tracking vector data for storms being tracked by the system. |
| 353 | NWP forecast database | Contains bias-corrected NWP forecast data. |
| 354 | Historical forecast archive database | Contains archived historical forecast data. |
| 355 | Forecast skill database | Contains calculated forecast skill metric data |
| 357 | Distribution function database | Contains probability distribution functions (PDFs), cumulative distribution functions (CDFs), and amplitude bias correction factors calculated by the amplitude bias backend program (680) |
| 358 | Forecast blending weights database | Contains forecast blending weight data calculated by the blending weight calculation program (664) |
| 362 | Ensemble member database | Contains ensemble member forecast data. Ensemble member forecast data is a subset of NWP processed data. |
| 364 | Ensemble forecast database | Contains ensemble forecast data, for example internally or externally generated ensemble forecast data (e.g., GEFS data). Ensemble forecast data is a subset of NWP processed data. |
| 366 | Blended forecast database | Contains generated blended forecast data. |

5.4 Exemplar Programs 5.4.1 NWP Data Processing Program (616)

The NWP data processing program (616) processes raw NWP data collected from an external data source in order to produce processed NWP data which includes, for example NWP data transformed to NWP tile layers of one or more $M_i$ cadence instances. An exemplary NWP data source is the National Oceanic and Atmospheric Administration (NOAA) which provides NWP forecast products including, for example, forecasts generated by the High-Resolution Rapid weather data and then calculates one or more metrics that indicate the accuracy (skill) of the forecast. There are two types of forecast skill metrics, immediate forecast skill and cumulative forecast skill. Immediate forecast skill is calculated using the immediate forecast error values, and cumulative forecast skill is calculated using cumulative forecast error values.

The program calculates the skill of a forecast that is being generated as part of a previous cadence instance forecasting cycle. The forecast skill calculation program processes one or more current cadence instance collected data or generated collected data tile layers and data from a forecast that is being calculated, or that was previously calculated, by a precipitation forecasting program (915) (e.g. forecast precipitation tile layer (2031)). The program processes the current forecast data and collected data to generate an immediate forecast skill metric at a forecast time point corresponding to a real world time point associated with the collected data, e.g., the current cadence instance time stamp. The output forecast skill metric value is saved to the forecast skill database, for example, associated with a forecast skill tile layer.

In an alternative use, the program calculates forecast skill metrics and forecast skill curve(s) for one or more forecasts, using, as inputs, the forecast to be archived and corresponding entry in the historical storm database, e.g. forecasts at forecast time points and historical data at data time stamps corresponding to the forecast time points.

Figure 5:
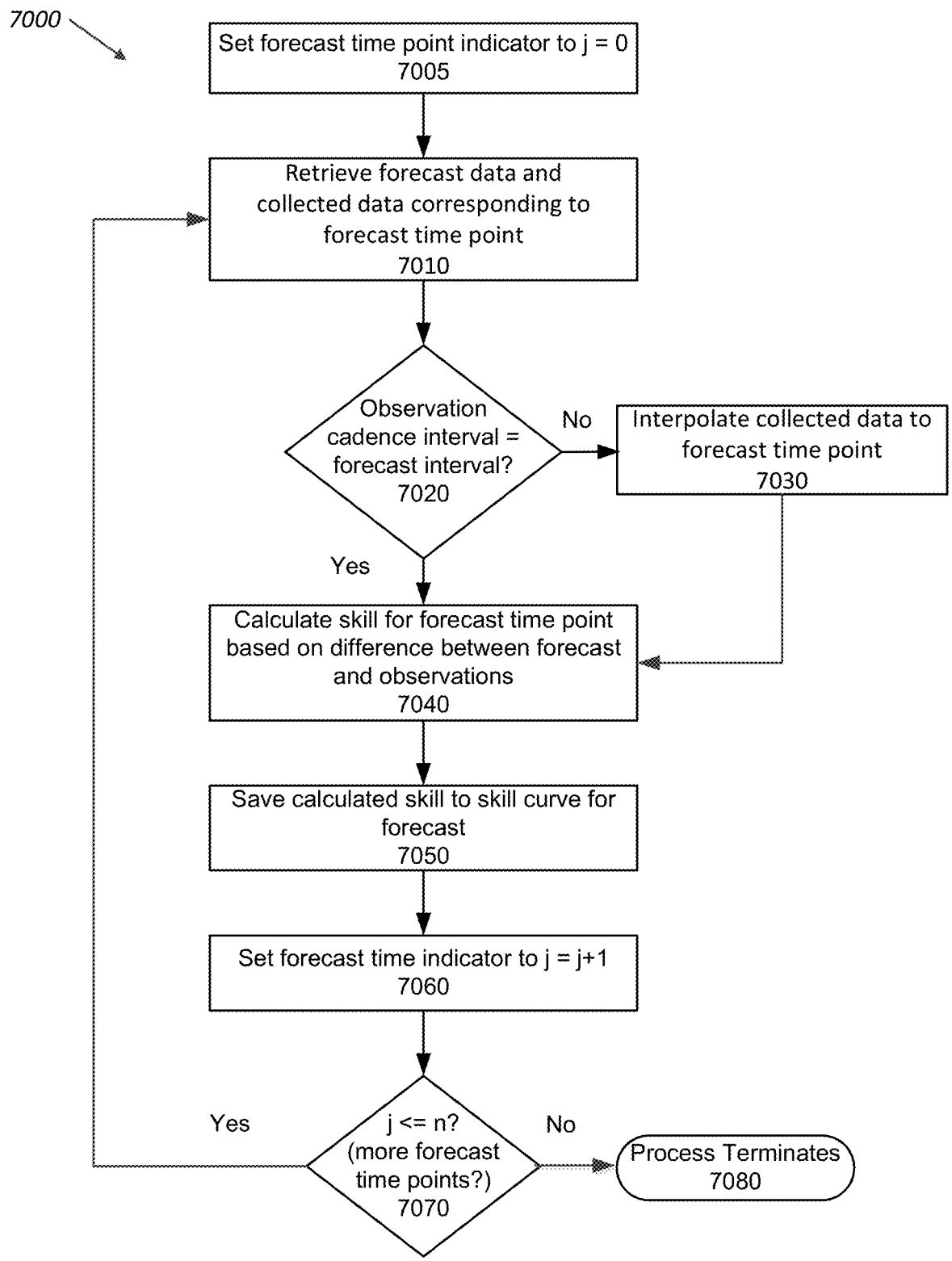
FIG. 5 is a flowchart illustrating an exemplary forecast skill determination method that the system implements to calculate a forecast skill at each forecast time point.

FIG. 5 depicts a flowchart illustrating an exemplary forecast skill calculation method (7000) used to calculate a forecast skill of a forecast. The program retrieves forecast data from a forecast dataset (e.g., a dataset corresponding to a NWP forecast, NowCast precipitation forecast, ensemble forecast, or blended forecast), and retrieves, from the historical storm database, historical storm information, for example historical weather parameter data (e.g., historical precipitation data, historical radar reflectivity data), corresponding to the retrieved forecast data. In some embodiments, the forecast skill calculation program retrieves weather parameter data corresponding to a current cadence instance from a corresponding weather parameter database (e.g., blended precipitation data from a blended precipitation database). The program compares forecast predictions at each forecast time (e.g., 12:00 pm, 12:15 pm, 12:30 pm, etc.) to corresponding weather parameter data of a cadence instance. For example, the forecast skill program compares $M_tF_2$ forecasted precipitation estimates with $M_{i+a}F_0$ blended precipitation estimates and $M_tF_2$ forecasted precipitation estimates with $M_{i+b}F_0$ blended precipitation estimates where $M_{i+a}$ cadence timestamp (e.g., 12:15 pm) corresponds to the $M_tF_1$ forecast time point (e.g., 12:15 pm) and $M_{i+b}$ cadence time stamp (e.g., 12:30 pm) corresponds to $M_tF_2$ forecast time point (e.g., 12:30 pm). The system first calculates one or more accuracy metrics by comparing one or more of the forecast data, collected data, generated data, and weather parameter data and then computes forecast skill by comparing accuracy metrics across the available forecasts to be input to the blending program. The system then optionally generates a forecast skill curve for each forecast time point.

At step (7005) the program initiates the method by setting a forecast time point indicator (j) to one. At step (7010), the program retrieves one or more of the forecast data, processed collected data, generated collected data, and weather parameter data corresponding to a forecast time point, e.g. for 12:15 pm, for which the system is calculating a forecast skill metric value. In an initial iteration of the method, the program calculates a forecast skill for the initial (i.e. j=1) forecast time point (e.g., for 12:15 pm forecast time). In each subsequent iteration of the method, the system calculates another forecast skill value for a subsequent forecast time point (e.g., 12:30 pm, 12:45 pm, etc.).

At step (7020), the program determines whether a cadence interval is equal to a forecast interval for the forecast time point being processed (i.e. whether the time stamp of the collected data retrieved in step (7010) matches the forecast time point of the forecast data retrieved in step (7010)). If the answer is yes, the program calculates a skill metric value based on one or more of the forecast data, collected data, generated data, and weather parameter data at step (7040).

If the cadence interval differs from the forecast interval, at step (7030), the program performs an interpolation operation on one or more of the collected data, generated data, and weather parameter data to produce new interpolated weather parameter data at a time point that corresponds to the forecast time point, for example by interpolating collected data with a time stamps of 12:10 pm and 12:20 pm to create an interpolated forecast time point for 12:15 pm. In an embodiment, the program determines an interpolation function experimentally. A linear interpolation scheme is tested and the program uses the linear interpolation scheme if results are satisfactory. Otherwise, the program uses a more complex, e.g., higher order polynomial (quadratic, cubic, etc), splines based upon recently collected data, or an interpolation function.

At step (7040), the program then calculates a skill metric value using the forecast data and the appropriate weather parameter data. In an alternative embodiment (not shown), the program calculates forecast data at additional forecast time points wherein each additional forecast time point corresponds to a cadence interval time stamp.

At step (7050), the system saves, in forecast skill database (355), the calculated skill for the forecast time point being processed to a skill curve data set corresponding to the forecast and then, at step (7060) increments the forecast time point indicator (j) by 1. At step (7070), the program determines whether there are additional forecast time points to process. If the program determines that all forecast time points have been processed, the program ends (7080). Otherwise, the program returns to step (7010) to retrieve and process additional forecast and collected data to generate skill metric values for a next remaining forecast time point.

5.4.2.1 Exemplary Forecast Blending Weight Determination Method

Figure 6:
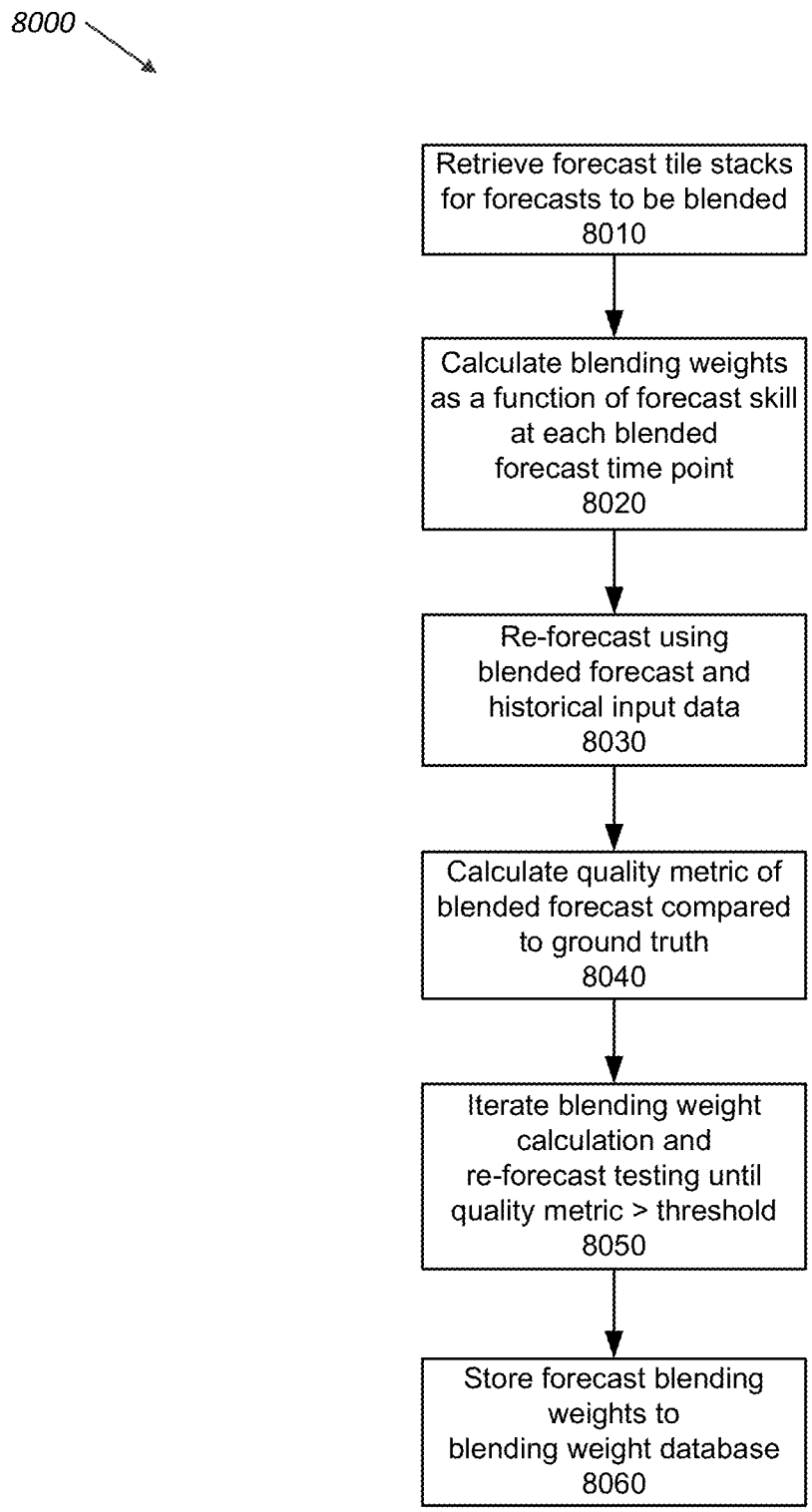
FIG. 6 is a flowchart illustrating an exemplary forecast blending weight determination method that the system implements to calculate blending weights for each input forecast to be combined in a forecast blending method.

FIG. 6 depicts a flowchart illustrating an exemplary forecast blending weight determination method (8000) to calculate blending weights for a plurality of input forecasts to be combined in a forecast blending method. Forecast blending produces blended forecasts with greater combined skill than the individual forecasts are used for input. For example, at early forecast time points, NowCast forecasts (e.g., forecasts generated by precipitation forecasting program (915)) produce precipitation forecasts with higher skill than that of numerical weather prediction (NWP) models such as NOAA's HRRR model. The skill of a current NowCast precipitation forecast and associated confidence in the precipitation estimates decays after a relatively short (0-3 hours) forecast time period. Forecast skill of longer range models, for example, NWP models such as the HRRR, remain sufficient for producing useful forecasts over a longer range forecast time period, e.g., 6 forecast hours or greater. Blending is the process of determining the weight each forecast should be given when combined into a blended forecast, based, at least in part, upon each forecast's skill at a particular point in time. The blending weights are determined by a forecast blending weight calculation program (664). The forecast blending program uses the blending weight determination method to pre-calculate the blending weights for two or more types of forecasts. In subsequent executions of a forecast blending program, the forecast blending program uses the pre-calculated blending weights to blend each set of input forecasts. In an alternative embodiment, the system calculates blending weights dynamically during execution of the blending program.

At step (8010), the blending weight calculation program retrieves forecast tile stacks from historical instances of forecasts for which blending weights are to be determined, either from the historical forecast archive database (354) or uses forecasts that have not yet been archived from one or more system forecast databases such as the ensemble forecast database (364) and/or the precipitation database (325). In a particular instance, the blending weight program retrieves a historical bias-corrected GEFS forecast and a historical NowCast, each initiated at the same day and time.

At step (8020), the blending weight program calculates blending weights for each input forecast at each forecast time point as a function of individual forecast skill at the forecast time point. For example, to calculate forecast blending weights in one exemplary embodiment, the blending weight program determines a time point where blending weights cross over from more heavily favoring a first forecast to more heavily favoring a second forecast. For example, the cross over point occurs at a forecast time point at which the forecast skills are substantially equal. In another example exemplary embodiment, the blending weight program determines a forecast time point before which a first forecast is used exclusively for populating a blended forecast, a second time point after which a blend of the first and second forecast is used, and a third time point after which a second forecast is used exclusively.

At step (8030), the blending weight program calculates, or causes a forecasting program to calculate, a re-forecast using forecast blending weights calculated in step (8020) and historical input data. At step (8040), the blending weight program calculates a quality metric, e.g., forecast error, of the re-forecast by comparing re-forecast results to ground truth based on observations collected, or calculated from collected observations, at each of the re-forecast time points. At step (8050), the blending weight program compares the calculated quality metric to a threshold and iterates steps (8020) through (8050) to recalculate and test forecast blending weights until a set of calculated blending weights produces a blended re-forecast of sufficient skill. The thresholds are dynamically determined based upon climatological analysis of forecast error (immediate and cumulative), obtained by comparing many historical forecasts vs. the collected weather parameter data (observations). The blending weight program then saves the calculated forecast blending weights to a blending weight database (358) at step (8060).

The system repeats the blending weight calculation process for each member of a set of multiple different forecast input data sets, each set member corresponding to different forecast start days and times, in order to further refine blending weights. The system generates blending weights for each of a plurality of different weather conditions (for example a first set of blending weights for forecasts during thunderstorms and a second set of blending weights for forecasts during snow storms) by executing method (8000) using sets of input forecasts corresponding to each weather condition. The system stores forecast blending weights in the forecast blending weights database (358).

5.4.3 Historical Storm Update Program (660)

The historical storm update program is executed to generate one or more archive entries in the historical storm database (351) corresponding to storms in the forecast and/or historical collected data being archived. The archived information may comprise storm objects, motion vectors, storm intensity profiles, and specific observation-related data, including any of configuration-specified collected data, generated data, or weather parameter data corresponding to the storm objects (i.e. historical current conditions at each tracked storm time point); and other storm metadata (e.g. storm track geographic features from map database). The program is configured to select, for archive, forecasts and storms with one or more particular characteristics, e.g. greater than a threshold peak intensity, greater than a threshold duration, and greater than a threshold size (e.g. geographic area coverage).

In an exemplary use, the historical storm update program processes a time series of radar reflectivity data sets corresponding to a forecast to be archived, for example a currently tracked storm with an observed peak intensity greater than the threshold peak intensity or a currently tracked storm that has lasted for greater than a threshold duration, e.g., for longer than 2 hours. In an exemplary embodiment, the historical storm update program processes a series of data sets including a data set with a time stamp that corresponds to the start time of the forecast to be archived and further data sets with time stamps that correspond to each further forecast time point to generate a radar reflectivity-based storm record corresponding to the historical storm.

In some exemplary embodiments, the historical storm update program generates two or more storm records for a particular storm, for example a radar reflectivity-based storm record and a blended precipitation estimate-based storm record. The historical storm update program saves the one or more storm records to the historical storm database. The program produces a storm track and time series of storm objects along the track with associated weather conditions, storm path information, and other metadata; which is saved to the historical storm database.

Figure 7:
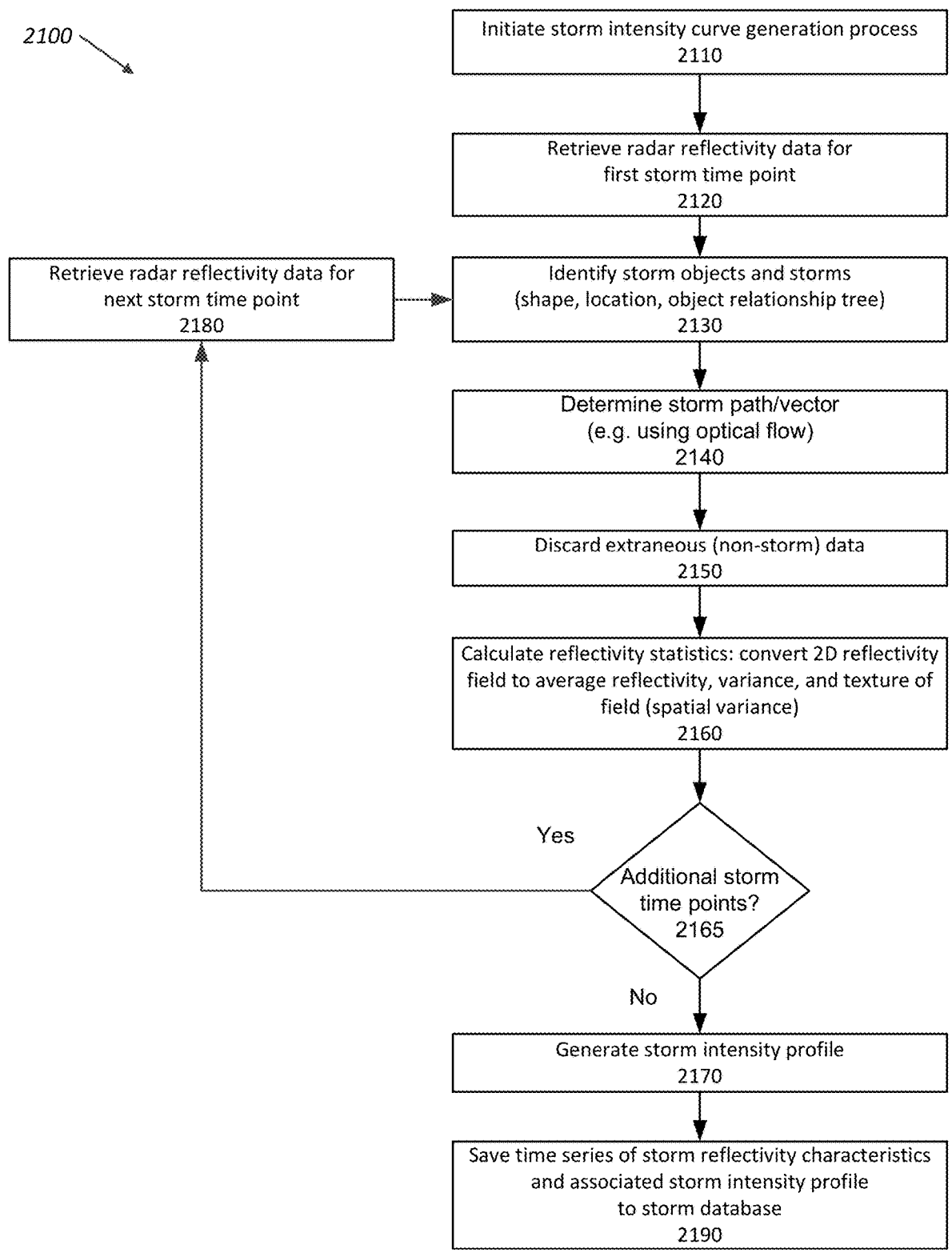
FIG. 7 depicts an exemplary historical storm database population and update method that is carried out by a historical storm update program executing on the offline/background processing server.

FIG. 7 depicts a flowchart illustrating processing, database population and update method (2100) performed by a historical storm update program (660) to populate the historical storm database with historical storm data. The historical storm update program processes a time series of weather parameter data (e.g. precipitation and/or radar reflectivity) corresponding to a tracked storm, represented as a series of $M_rF_O$ collected tile layers and corresponding storm object and motion database entries over a specified time period and uses this processed data to populate the historical storm database with historical storm data corresponding to the tracked storm and to its corresponding storm intensity profile.

In one exemplary embodiment, the historical storm update program extracts storm objects and motion vectors from the radar or precipitation data. In another exemplary embodiment, the historical storm update program uses previously extracted or collected (and stored in the storm objects database) storm object and motion vector data extracted, and saved to the storm objects database. The historical storm update program determines characteristics of a storm based, at least in part, on the extracted storm objects and motion vectors. The historical storm update program calculates a storm intensity profile for the storm, and saves storm characteristics and storm intensity profile to the historical storm database.

In some exemplary embodiments the historical storm update program saves additional historical storm data, i.e. one or more of the data types listed in Table 2, to the historical storm database or generates tags or other links to some or all of the historical storm data. For example, in some exemplary embodiment the historical storm update program copies data from weather parameter tile layers to the historical storm database and links additional weather parameter data tile layers to an entry in the historical storm database without copying corresponding data into the historical storm database. In some embodiments, upon system initiation the historical storm update program populates the historical storm database (351) with data from historical storms, which it retrieves from a collected data source, for example from one or more radar data sources.

While the system is in operation, the historical storm update program periodically performs the database population and update method (2100) to process new data recorded by the system in order to continuously update and improve the storm database with information about additional storms that are tracked by the system.

The program initiates the method (2100) at step (2110) to process data to create a historical storm record, with selectable features, corresponding to a historical storm that was tracked by the system and to generate a storm intensity profile corresponding to the historical storm. While processing new data, the system typically executes the historical storm object program either as part of the data collection or post-collection processing stages, or executes the program out-of-band, for example on a periodic basis, e.g. once per day, or as otherwise scheduled, such as in a nightly processing process.

At step (2120) the system generates the historical storm initial conditions data based on radar reflectivity data where the historical storm update program loads radar reflectivity data for a first storm time point, for example, an $M_i$ collected radar reflectivity tile layer (2041) where $M_i$ cadence instance time stamp corresponds the first storm time point. The first storm time point corresponds to an initiation of a historical storm or a first recognition and initiation of tracking, by the system, of a storm during system operation. The initial conditions also captures the weather parameter data around the storm.

In some embodiments, the historical storm update program uses pre-stored storm objects and motion vectors from the storm objects database. In these embodiments, the historical storm update program does not perform steps (2130) and (2140). If there are not pre-stored storm objects and motion vectors for a storm, the historical storm update program performs steps (2130) and (2140) to create the storm objects and motion vectors and store them in the storm objects database.

The historical storm update program optionally processes radar reflectivity corresponding to a storm time point at step (2130) in order to identify storm objects and storms. The historical storm update program uses an image processing method to identify storms, storm locations (e.g., center point of a storm), and storm objects, and to characterize storm and storm object shapes as well as relationships between storm objects. Relationships between storm objects encodes geographic relationships and common storm relationships (i.e. linking multiple storm objects such as individual cells together as components of a single storm or storm front). In further exemplary embodiments, the historical storm update program processes one or more additional or alternative precipitation weather parameter data types, for example blended precipitation estimates comprising microwave precipitation estimates, to extract storm objects and motion vectors and populate the historical storm database. In some alternative embodiments, the historical storm update program retrieves, from a storm objects database (350), storm objects and motion vectors and uses these to populate a historical storm database instead or in addition to processing radar reflectivity.

At step (2140) the historical storm update program then optionally determines motion vectors for storms and storm objects by comparing locations of storms and storm objects identified in step (2130) to their locations at earlier time steps. In an embodiment, the historical storm update program uses an optical flow method to determine the motion vectors. The new storm objects and motion vectors are stored in the storm objects database.

At step (2150) the historical storm update program garbage collects non-storm data to remove, from the historical storm database, reflectivity data that does not correspond to recognized storms and storm objects.

At step (2160) the historical storm update program calculates statistics of the storm-related radar reflectivity data to transform the two dimensional reflectivity fields to a set of representative values. The historical storm update program calculates average reflectivity, variance, and texture (e.g., spatial variance) of the radar reflectivity field.

The historical storm update program determines, at step (2165) whether there are additional storm time points for the storm being processed and, if so, retrieves radar reflectivity data for the next storm time point (e.g., $M_{i+1}$ collected radar reflectivity tile layer) at step (2180) and loops to step (2130) to begin processing the retrieved data. When reflectivity data from all storm time points has been processed, the historical storm update program generates, at step (2170) a storm intensity profile based on a processed time series of reflectivity data corresponding to the storm and/or additional weather parameters, including controlling variables associated with the storm. At step (2190) the historical storm update program saves, to the historical storm database, information corresponding to the storm including a time series of radar reflectivity characteristics including statistics calculated in step (2160), for each storm time point and the corresponding storm intensity profile calculated at step (2170).

In some exemplary embodiments, the set of historical storms tracked by the system and stored in the historical storm database comprises a data set representing the long-term average of historical storm-related weather parameters.

Different factors and sets of factors, e.g., weather parameter types such as temperature, humidity, and wind, can each have a greater or lesser effect on the evolution of different storms and storm types. Because of this, individual types of weather parameter data used as inputs to a storm forecast can influence the accuracy or skill of the forecast. Embodiments of a precipitation modeling and forecasting system according to the technology described herein are configured to determine controlling variables of historical weather forecasts and controlling variables of historical forecasts for storms having similar characteristics based on historical storm data associated with the storms, e.g., storm type, time of year, or direction of approach. Controlling variables are defined herein as one or more forecast model inputs used to initiate a forecast calculation that impact skill of a forecast generated by the model. Forecast model inputs include, for example, one or more types of collected generated or collected processed data, e.g., blended precipitation estimates and temperature values.

Figure 8:
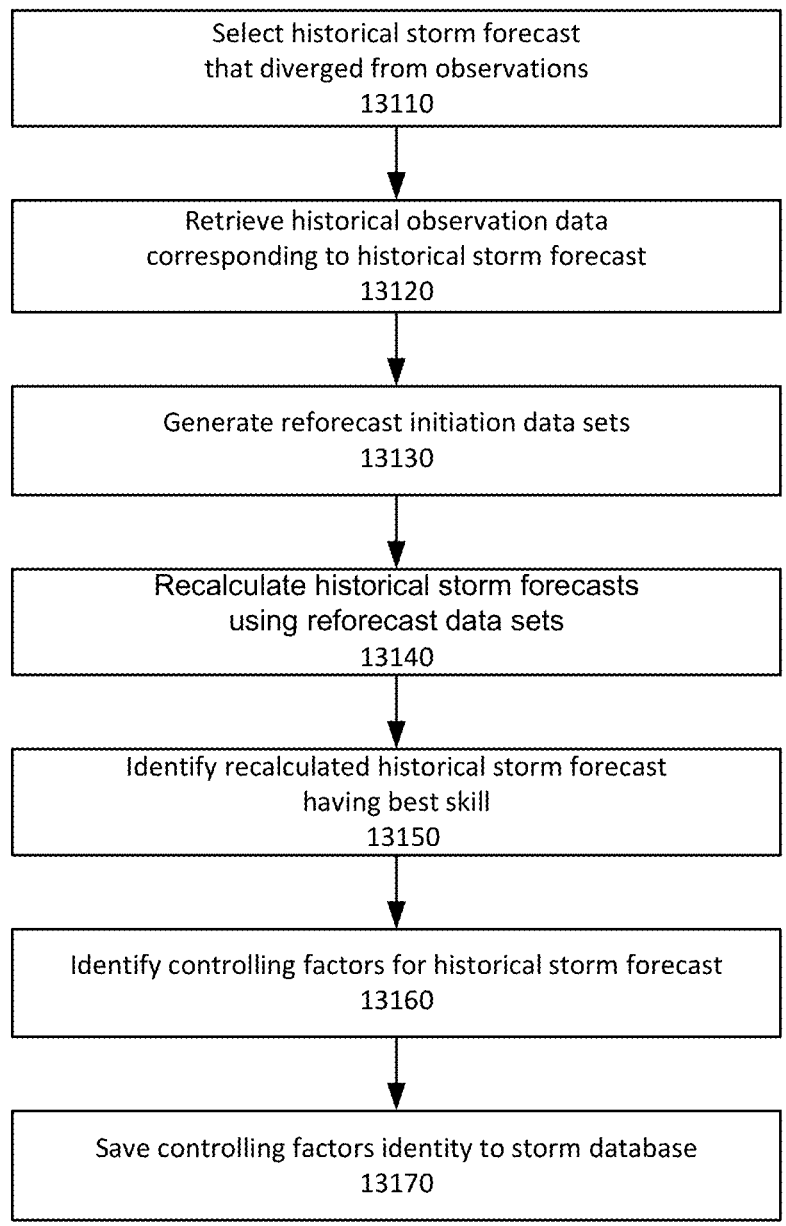
FIG. 8 is a flowchart illustrating an exemplary method for determining controlling factors of a historical storm forecast.

FIG. 8 depicts a flowchart illustrating an exemplary historical storm forecast controlling variable determination method (13100) that is carried out by a historical storm update program (660) in order to determine controlling variables of a historical storm forecast and corresponding historical storm.

At step (13110), the historical storm update program selects, from the historical storm database, a historical storm forecast that diverged from observations (e.g. the forecast error was high or the forecast skill was low). In an exemplary embodiment, the historical storm update program selects a historical storm forecast with forecast skill that is less than a threshold value at one or more forecast time points.

At step (13120) the historical storm update program retrieves historical weather parameter data corresponding to the selected historical storm forecast.

At step (13130), the program processes the retrieved weather parameter data to generate multiple re-forecast initiation data sets, each of which includes a different configuration of weather parameter data corresponding to a re-forecast initiation time point. In an exemplary embodiment, each re-forecast initiation data set includes one or more of different configurations of weather parameter data types, different volumes or densities of weather parameter values, and weather parameter values from different sources. Re-forecast initiation data sets can be generated using a method, or a method similar to, one or more known methods for assessing impact of forecast inputs on forecast skill, for example a denial of data or observation system experiment (OSE) method.

In a first exemplary embodiment, the re-forecast initiation time point corresponds to a forecast time of the historical forecast initiation, i.e. corresponding to $M_rF_0$ forecast time point, and the historical storm update program generates re-forecast initiation data sets corresponding to historical forecast initiation.

In a second exemplary embodiment, the re-forecast initiation time point corresponds to a forecast time point at which the historical forecast deviated from observations. The historical storm update program determines a deviation forecast time point which is a forecast time point at which the historical storm forecast deviated from observations, for example a forecast time point at which forecast skill dropped below a threshold value or where one or more forecasted parameters deviated from observations by more than a threshold amount. The historical storm update program generates re-forecast initiation data sets corresponding to the deviation forecast time point or a forecast time point preceding the deviation forecast time point.

At step (13140) the historical storm update program causes one or more instances of the forecast model corresponding the historical storm forecast to generate, for each re-forecast initiation data set, a recalculated storm forecast using the re-forecast initiation data set as forecast model input.

At step (13150) the historical storm update program generates a skill metric value for each of the recalculated storm forecasts, compares the skill metric values, and determines which of the recalculated storm forecasts has the best skill. At step (13160) the historical storm update program identifies the controlling variables of the historical storm forecast based on the forecast initiation data set that was used as forecast model input for the recalculated forecast having the best skill metric values. At step (13170), the historical database update program makes a record of the identified controlling variables in an entry corresponding to the historical storm forecast in the historical storm database.

In an alternative exemplary embodiment, the historical storm update program performs a method similar to that illustrated in FIG. 8 to determine controlling variables of some or all of the historical storm forecasts in the historical storm database regardless of forecast skill.

5.4.4 Forecast Archive Program (668)

The forecast archive program moves information about one or more the forecast to be archived to a historical forecast archive database (354). The forecasts selected for archive are configurable, either by attribute or by age. The program retrieves forecast data from one or more forecast databases (e.g., blended forecast database (366), precipitation forecast database (325), and/or storm objects database (350)), and moves this data to a historical forecast archive database (354).

The program, when archiving a forecast, checks the forecast set and each of the forecasts that make up the forecast cycles of the forecast set to determine if any of the forecasts are flagged as having an error. If any of the forecasts are flagged as having an error, the system then undertakes a series of steps to determine the type and root cause of the error and to determine a forecast error classification. The steps taken vary based upon the type of forecast and the magnitude of the error. The resulting determinations are saved to the system database associated with the forecast set.

If the determination is that the forecast error is a result of an error in a trained model, the system optionally retrains one or more machine learning trained models in order to resolve the root cause of the forecast error. Alternatively, it marks the trained model for later retraining.

The historical forecast archive database may be stored on offline or nearline storage.

5.4.5 Exemplary Method for Populating a Historical Storm Database and Calculating Storm Intensity Decay Curve This section describes methods that the system implements to process current weather parameter data to track storms, populate a historical storm database with data corresponding to storms tracked by the system, and to calculate storm intensity profiles corresponding to storms stored in the historical storm database. This processing is primarily carried out on the offline/background processing server, and the resulting data is used by weather condition prediction programs of the modeling and prediction server to make forecasts.

5.4.5.1 Building a Historical Storm Database

In one exemplary embodiment of the method, system historical storm update program (660), to periodically populate and update historical storm database (351) with historical storm data. Historical storm data corresponding to a particular storm includes, at least, tracked storm objects and storm motion data and includes, in some embodiments, additional data corresponding to a tracked storm such as weather parameter data, e.g., precipitation estimate data, and ancillary data, e.g., geographic features corresponding to a storm track. Table 2 includes examples of historical storm data types.

TABLE 2

| Historical Storm Data | |
| --- | --- |
| Data type | Definition and/or examples |
| Storm objects | Polygon or raster representation of storm extracted from radar reflectivity data, number of convective cells, relationships between storm objects (e.g., between individual cells] that make up the storm |

TABLE 2-continued

Historical Storm Data

| Data type | Definition and/or examples |
|---|---|
| Radar reflectivity data | Radar reflectivity fields that make up the storm, statistics calculated from the radar reflectivity fields including, for example, average reflectivity, variance, and texture of the field represented by spatial variance of reflectivity |
| Storm intensity profile | Profile type and parameters, for example a hyetograph or linear equation representing precipitation intensity over time |
| Offset on storm intensity profile curve | Where on the profile a storm is during a current cadence interval |
| Storm geometry | Storm shape including geometry and orientation, for example represented by data including polygon shape, size, area, volume, height, and orientation, |
| Storm location | Starting location, location at each forecast time point, for example defined by geographic location of center point of the storm, for example geographic coordinates of a centroid of a shape representing a storm |
| Storm location and motion data | Motion vectors generated from radar reflectivity data, storm track, current projected track [e.g., based on motion vectors or based on motion field), approach vector to a specific location [e.g., to Miami, FL from the South East) |
| Geography | Geographic/topographic features along storm track, for example mountains, bodies of water, urban heat sink |
| Storm type | Stratiform, convective, thunderstorm, blizzard, hurricane |
| Time of day | Storm initiation time, storm data time points, storm tracking end time |
| Insolation | Amount of solar radiation reaching a given area |
| Weather parameter data | Temperature, humidity, CAPE, precipitation intensity [e.g., peak, average, precipitation tile layer, for example based on microwave precipitation blended with precipitation from one or more additional precipitation data sources), prevailing wind speeds and conditions, for example from a numerical weather prediction model |
| Atmospheric conditions | Liquid water content and other atmospheric water, isotherm altitudes, large scale atmospheric condition {e.g., el Niño) |
| NWP data | Collected processed data from a NWP model data source that includes characteristics of storm environment and ambient weather parameter data |

The historical storm update program retrieves, from the storm objects database (350), storm object and motion data calculated over a series of cadence instances corresponding to a historical storm. For example, the historic storm update program retrieves a set of storm objects corresponding $M_tF_0$ through $M_nF_0$ forecast stacks where the historical storm occurred over a series of cadence instances ranging from 1 through n. The historical storm update program copies the set of storm objects to the historical storm database and in some exemplary embodiment calculates an overall storm track based on the set of storm object and motion data sets. In some embodiments the historical storm update program retrieves additional historical storm data for each of the cadence instances in the series of cadence instances corresponding to the historical storm and saves the data to the historical storm database. In other exemplary embodiments, the historical storm update program tags a historical storm record in the historical storm database with references to one or more corresponding collected data database entries that include historical storm data, for example a blended precipitation database. In an exemplary embodiment, the historical storm database includes a record of historical storm data including one or more of the historical storm data types listed in Table 2.

In some exemplary embodiments, the historical storm update program populates the historical storm database with information including storm objects and motion vectors or motion fields from system memory and/or the storm objects database. In an alternative exemplary embodiment, a radar data collection program (e.g. 420) or a radar data processing program (611) performs the necessary calculations to extract storm objects from radar reflectivity data, and saves the extracted storm objects as storm object data to the storm objects database.

5.4.5.2 Calculating Storm Intensity Decay Curves

In an exemplary embodiment, the historical storm update program calculates a storm intensity profile for each historical storm in the historical storm database by constructing a precipitation hyetograph (i.e. a plot of measured precipitation intensity as a function of time) using historical collected data that is stored in a system database. The program retrieves, from the historical storm database and/or a precipitation database, a time series of historical storm object data and historical precipitation estimates corresponding to a tracked storm, processes the retrieved data to generate a time series using either the maximum estimated precipitation or average estimated precipitation within the tracked storm objects, and generates a hyetograph for the tracked storm based upon the selected time series. The system then performs a curve fitting operation to calculate storm intensity profiles based on the hyetographs. Alternatively, the storm intensity profile can be generated in the form of linear equations with parameters generated by the curve fitting operation, or as a time series of storm intensity points extracted from the hyetographs.

Figure 9:
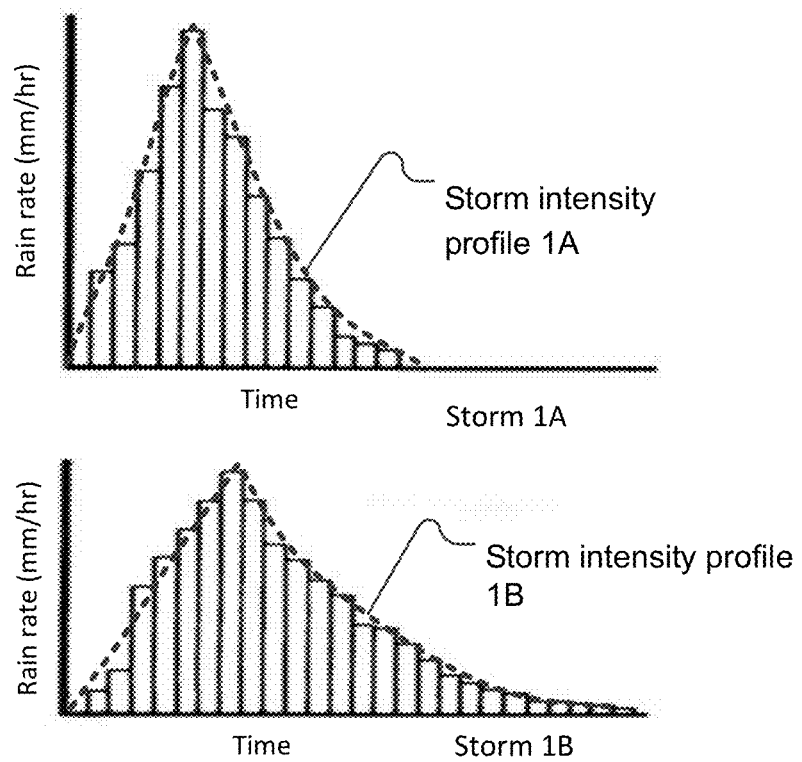
FIG. 9 illustrates exemplary hyetographs and corresponding storm decay curves.

Referring to FIG. 9, exemplary hyetographs and corresponding storm intensity profiles (1A, 1B) are illustrated. Each historical storm includes different characteristics. Exemplary historical Storm 1A hyetograph and corresponding storm intensity profile 1A represents a convective storm that has an identified set of characteristics, e.g. the storm approached a specific location from a particular direction following a particular path and speed, during a particular season or month, at a particular time of day and under particular current weather conditions (e.g., current temperature and humidity). Exemplary historical Storm 1B and corresponding storm intensity profile 1B represents a convective storm with characteristics similar to Storm 1A except that Storm 1B approached the location from a different direction along a storm path that passed over different geographic features and in differing weather conditions. The exemplary storm intensity profiles illustrated in FIG. 9 are each characterized by a curve representing intensity of precipitation, or some other weather parameter (e.g., wind speed, pressure) over time. Storm intensity profiles 1A and 1B each include a rising portion representing increasing intensity, a peak intensity, and a falling portion, representing decreasing intensity. One familiar with the art will recognize that storms can have intensity profiles with more different, e.g., more complex, shapes including multiple peaks and multiple corresponding rising and falling portions.

In some exemplary embodiments, the system includes a storm intensity profile blending program (665) that creates a blended storm intensity profile that is a blend of the intensity profiles corresponding to a group of two or more input storms with similar characteristics. The storm intensity profile blending program uses statistical analysis techniques or machine learning approaches to determine a group of storms with similar characteristics, computes the hyetograph and corresponding storm intensity profiles, and calculates a generalized storm intensity profile for the selected group of storms. In an exemplary embodiment, the storm intensity profile blending calculates a blended hyetograph by averaging values in multiple storm hyetographs and generates a blended storm intensity profile based on the blended hyetograph. In another exemplary embodiment, the storm intensity blending profile calculates blended storm intensity profile by generating a best fit curve of a plot that includes precipitation intensity over time for each storm that is included in the blended storm intensity profile. In this manner, the storm intensity profile blending program generates a first blended storm intensity profile that describes a group of historical convective storms that approached from the northeast on summer afternoons, and a second blended storm intensity profile that that describes historical convective storms that approached from the south on summer afternoons. In an exemplary embodiment, the storm intensity profile blending program generates a non-parametric storm intensity profile (rather than a fixed functional form such as an equation) as output of a storm intensity profile blending process. The storm intensity profile blending program stores calculated storm intensity profiles and associated storm characteristics data in a historical storm database.

5.4.6 Forecast Correction Program (672)

The forecast correction program receives storm tracking data, and applies a local correction factor to forecast data based on a tracked storm in order to blend storm and tile data. For example, in one exemplary embodiment, the storm tracking program tracks the geographic location of a storm and the forecast correction program identifies a region represented by a portion of a forecast tile layer of a forecast stack $M_iF_j$ that is geographically co-located with the storm. The forecast correction program calculates a correction factor for each forecast tile layer of the forecast stack $M_iF_j$ to correct forecast data corresponding to the identified region. The forecast correction program calculates correction factors based on characteristics of the storm. For example, in an exemplary implementation the forecast correction program identifies a region of a temperature tile layer that is co-located with a rain storm and calculates a correction factor for the identified region that adjusts temperature downward based on a cooling effect caused by rain (e.g., based on evaporative cooling).

The program performs additional adjustments to weather parameter data and forecast data based on tracked storm object characterization and forecasting. The system stores weather parameter data including precipitation, temperature, and humidity data as tile layers (i.e. as grid cell data) in the system database and executes one or more forecasting programs that use Lagrangian or semi-Lagrangian schemes (not shown) in order to calculate weather parameter forecasts based on physics and motion field vectors. The program uses knowledge of tracked storms to adjust weather parameter data and forecasted data values.

Figure 10:
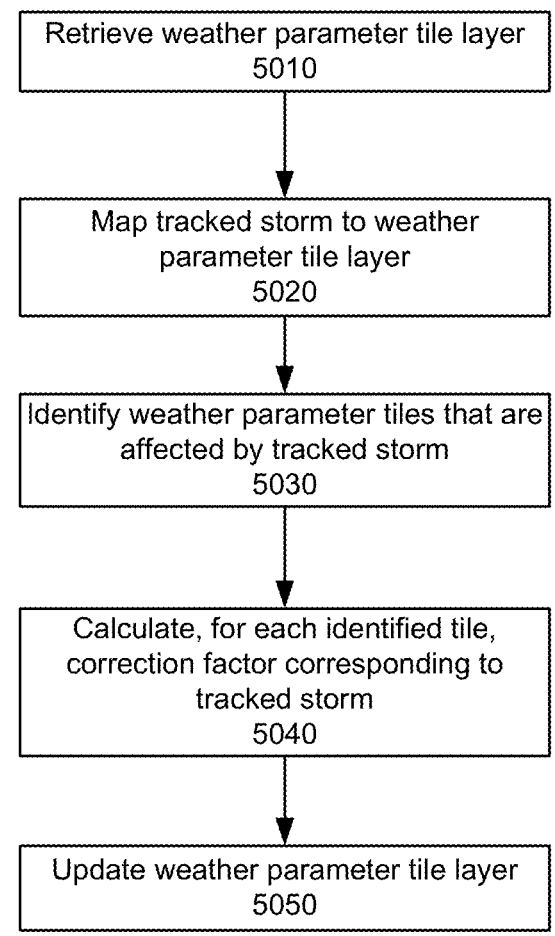
FIG. 10 is a flowchart illustrating an exemplary storm effects blending method.

Referring to FIG. 10, a flowchart illustrating an exemplary storm effects blending method (5000) is shown. In the illustrated embodiment, the system uses the storm object effects blending method to adjust values of one or more forecast data tile layers that can be influenced by effects associated with a tracked storm. In additional embodiments, the system implements a similar method to adjust tile layers containing weather parameter data including processed collected and generated collected data.

At step (5010) the forecast correction program retrieves a $M_iF_j$ forecast tile layer, e.g. a forecast temperature or precipitation tile layer. At step (5020), the forecast correction program then maps a tracked storm to the retrieved tile layer by identifying a geographic storm location (e.g., storm center point location) on the coordinate system of the retrieved tile layer at $M_iF_j$ forecast time point and mapping a shape and orientation of the storm to the retrieved tile layer. In an exemplary embodiment, the forecast correction program maps multiple tracked storms and multiple storm objects (e.g., multiple individual storm cells) comprising each tracked storm to the retrieved tile layer.

At step (5030), the forecast correction program identifies one or more regions or groups of regions of the retrieved tile layer that are affected by the tracked storm. In an exemplary embodiment, the forecast correction program identifies affected retrieved tile layer regions as those enclosed (either partially or fully) by a storm or storm object shape overlaid on the retrieved tile layer.

At step (5040), the forecast correction program calculates a correction factor for each identified region or group of regions based on characteristics of overlying storms or storm objects that can affect weather parameters represented by the tiles. In an exemplary embodiment, the system records correction factors as a correction factor $M_iF_j$ tile layer stack that includes tile layers that encode a correction factor at each grid tile.

At step (5050) the forecast correction program updates the weather parameter tile layer by adjusting weather parameter values corresponding to the identified region or groups of regions using the correction factor. In one particular exemplary embodiment, the system linearly adds each correction factor tile layer to each corresponding $M_iF_j$ tile layer, for example by adding a correction factor encoded in each tile of the correction factor tile layer to a corresponding tile of a corresponding weather parameter tile layer. For example, in one exemplary implementation the forecast correction program calculates a cooling correction factor corresponding to evaporative effects of precipitation corresponding to a storm cell and applies the cooling correction factor to temperature tile layer regions that are covered by the storm cell.

5.4.7 Amplitude Bias Backend Program (680)

In an exemplary embodiment, a bias correction program corrects ensemble amplitude bias based on a comparison of historical weather parameter data, for example historic precipitation estimates collected or calculated by the system, and forecast data, for example precipitation forecasts, generated by an ensemble model. The discussion herein includes methods for amplitude bias correction of precipitation forecasts but is applicable to other weather-related parameters forecast by the ensemble model.

In this exemplary embodiment, the system includes an amplitude bias backend program (680). The amplitude bias backend program accesses a database comprising a long-term, for example 5 to 10 year, archive of instantaneous precipitation rate historical weather parameter data (e.g., processed collected precipitation data from weather sensor database (323)). The amplitude bias backend program also accesses a long term historical archive of forecast precipitation estimates (e.g., from historical forecast archive database (354)) generated, for example by one or more forecasts or ingested by the system from a NWP model data source.

The amplitude bias backend program creates a probability distribution function (PDF) or cumulative distribution function (CDF) of the distribution of instantaneous precipitation rate weather parameter data values for regions of the system domain and for all time periods chronicled in the archive. The amplitude bias backend program saves the weather parameter data precipitation PDFs and CDFs to distribution function database (357).

Figure 11:
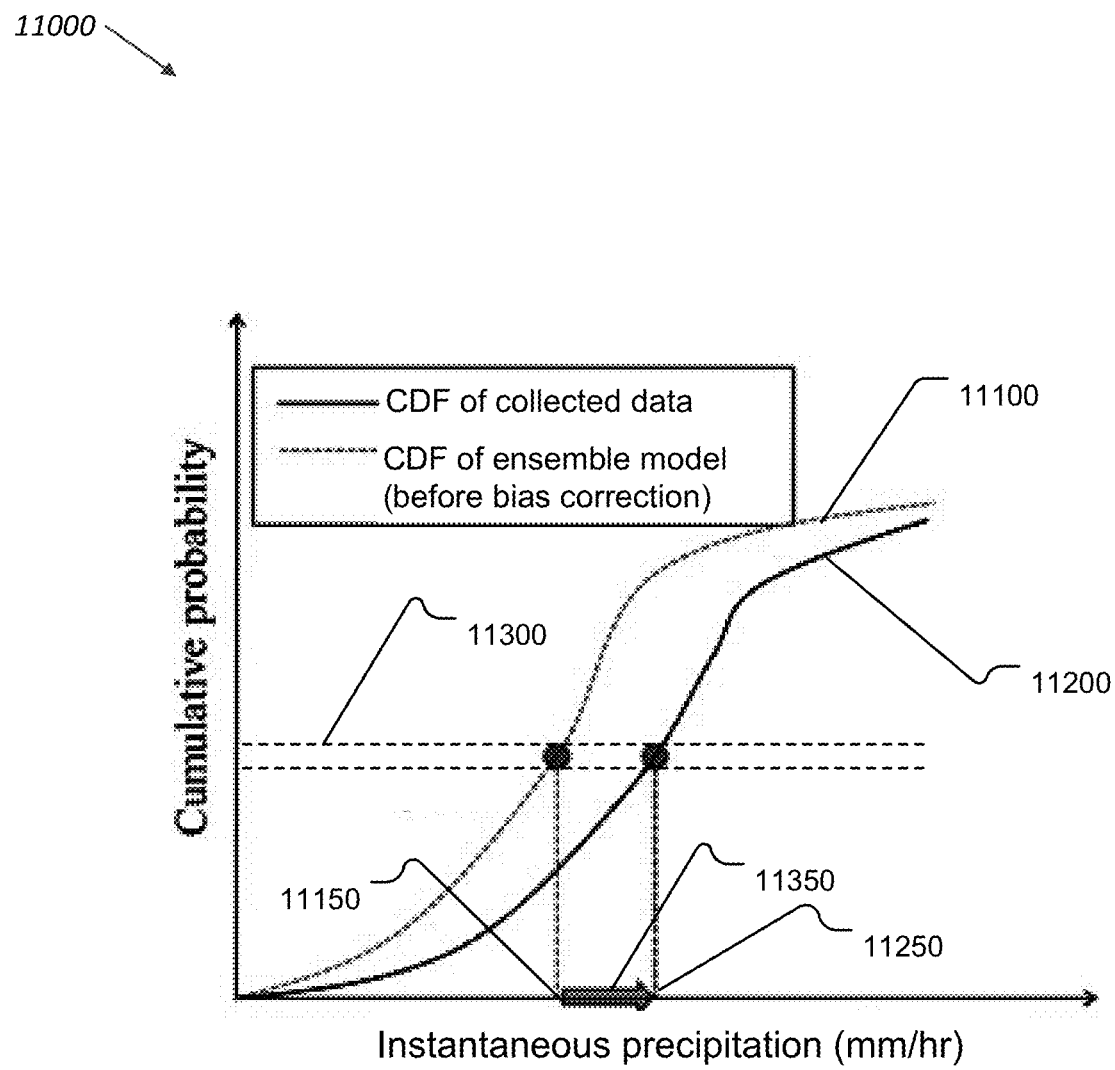
FIG. 11 depicts an exemplary plot of a CDF of historical instantaneous precipitation collected data values and of a historical CDF of ensemble model forecast values.

The amplitude bias backend program creates a similar PDF or CDF of historical forecasted precipitation estimates generated by ensemble forecasts. The amplitude bias backend program saves the historical forecast precipitation PDFs and CDFs to distribution function database (357). FIG. 11 shows an exemplary plot (11000) of a CDF of instantaneous precipitation historical weather parameter data values (11200) and of historical CDF of ensemble model forecast values (11100).

The amplitude bias backend program then discretizes each of the weather parameter data and ensemble CDFs into a set of bins, for example percentile or decile bins, of precipitation intensity. The amplitude bias backend program then pre-calculates correction factors for each bin by computing a delta between values of historical weather parameter data and historical ensemble precipitation rates of corresponding bins. For example, referring to FIG. 11, bin (11300) is illustrated for ensemble CDF (11100) and weather parameter data CDF (11200). The bin value of ensemble precipitation (11150) is less than the corresponding bin value of weather parameter data precipitation (11250) by a delta (11350). The amplitude bias backend program determines that the magnitude and direction (e.g. positive or negative) of delta (11350) is the pre-calculated correction factor for ensemble bin (11300). The amplitude bias backend program generates similar pre-calculated correction factors for each bin (e.g., for each decile) and saves the pre-calculated correction factors to distribution function database (357) for use by a bias correction program. The amplitude bias backend program performs calculations to update the correction factors as the system collects and processes additional weather parameter data and ensemble forecast data, for example as a scheduled update performed periodically, for example once per day or once per week.

When the system receives a newly generated ensemble forecast, the bias correction program retrieves the saved correction factors and uses them to remove amplitude bias from the forecast. The bias correction program calculates a CDF of the newly generated ensemble forecast and discretizes the CDF into bins corresponding to the bins of the saved correction factors. For each bin (e.g., for each decile), the bias correction program adjusts the ensemble forecast value by the magnitude and sign (positive or negative) of the bin's correction factor. In the example illustrated in FIG. 11, the bias correction program adjusts a forecast precipitation value of decile (11300) by adding the magnitude of delta (11350) to the forecast precipitation value. In some exemplary embodiments the system uses a similar method to correct bias of NWP forecasts generated by the system or ingested by the system from an external NWP forecast source.

In a further example of amplitude phase correction, the amplitude bias backend program stratifies historical precipitation data and corresponding forecast model data based on precipitation type (e.g., rain and snow) and calculates correction factors for each precipitation type. In an exemplary embodiment, when the bias correction program analyzes a newly generated ensemble or NWP forecast, it selects and uses correction factors corresponding to an expected or forecast precipitation type.

In some exemplary embodiments, the amplitude bias backend program includes or is associated with an instance of online or offline ML model execution program (946, or 646 respectively) that executes a ML model trained to perform an online learning version of the described process to determine amplitude bias correction factors to correct variations between the NWP or ensemble forecast and radar precipitation rate CDFs due to spatio-temporal variability.

Pre-calculating correction factors enables the system to perform real-time bias correction of forecasts.

5.4.8 Precipitation Forecasting Program (915)

Figure 12:
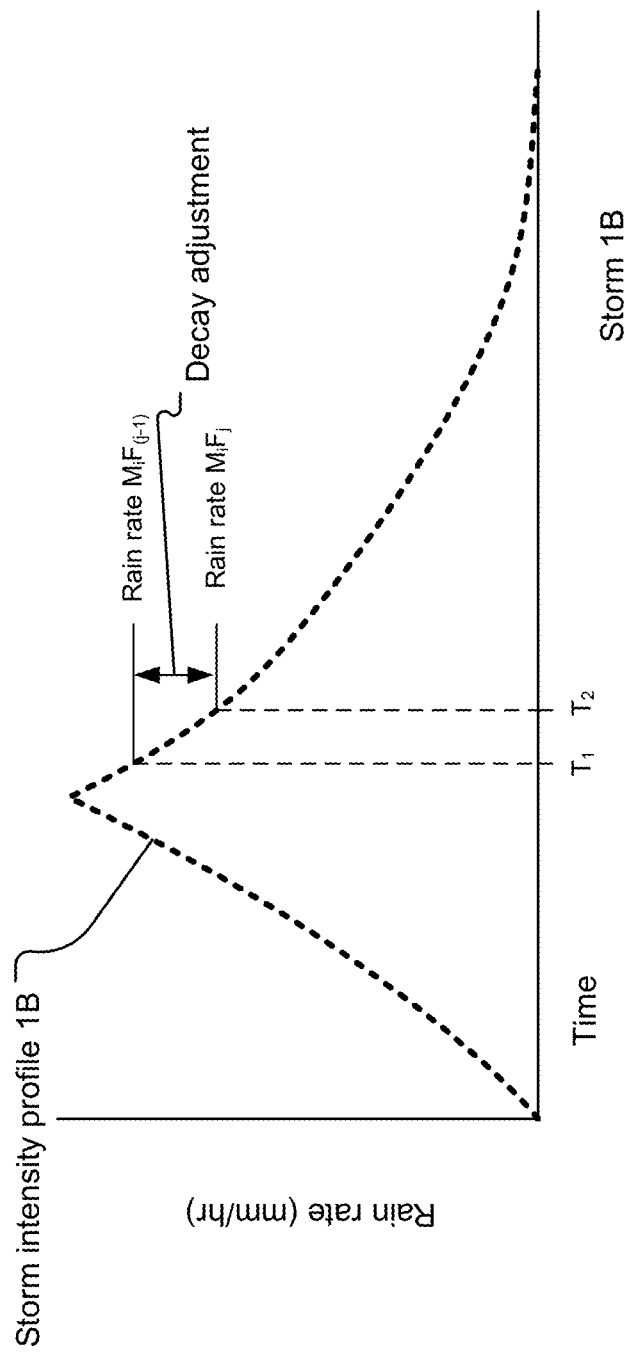
FIG. 12 illustrates an exemplary method for adjusting precipitation intensity based on a storm intensity profile during calculation of precipitation estimates.

In an exemplary embodiment, a precipitation forecasting program (915) calculates a forecast precipitation intensity in a region associated with a tracked storm. The precipitation forecast program calculates a precipitation intensity for a $M_iF_j$ forecast time point, calculates a precipitation intensity offset based on the tracked storm's associated storm intensity profile, and adjusts the calculated precipitation intensity using the selected calculated precipitation intensity offset. The program then calculates the forecast precipitation intensity using any known precipitation forecasting methods, such as using an advection-based forecasting method, or alternatively, by using persistence of motion vectors. The precipitation forecasting program also adjusts the calculated $M_iF_j$ precipitation intensity by a storm intensity-based adjustment factor which is calculated based on the storm intensity profile associated with the tracked storm and the relative positions of j−1 and j time points on the storm intensity profile. FIG. 12 illustrates a result of the precipitation forecasting program adjusting shifted precipitation intensity during calculation of $M_iF_j$ precipitation estimates for a storm that the system has identified to be similar to storm 1B illustrated in FIG. 6.

The precipitation forecasting program determines that $M_iF_{(j-1)}$ time point corresponds to forecast time point $T_1$ on the storm intensity profile which is, in this example, on the decaying leg of the curve. The precipitation forecasting program can determine the position of $M_iF_{(j-1)}$ time point in a number of ways, for example based on time series analysis of precipitation intensity over successive cadence cycles or by mapping an initial point on the decay curve at $M_iF_0$ and then incrementing position along the curve at subsequent forecast time points. The precipitation forecasting program calculates forecast time point $T_2$ of $M_iF_j$ as $T_1$ plus forecast time increment. The precipitation forecasting program then calculates a storm intensity profile adjustment factor which is equal to rain rate at $T_2$ minus rain rate at $T_1$ (a negative value in the present example) and adds the adjustment factor to $M_iF_j$ precipitation previously calculated by the advection model. The storm intensity profile adjustment factor represents an amount of precipitation intensity increase or decrease that would be expected between forecast time points based on the storm intensity profile. When forecast precipitation estimates are adjusted to include effects of storm intensity growth and decay, the system increases the value of a metric representing confidence in the adjusted forecast estimates.

5.4.9 Precipitation Blending Program (918)

The precipitation blending program (918) blends two or more processed, collected or generated precipitation tile layers to generate blended precipitation data. In a first exemplary implementation, the precipitation blending program blends two or more input tile layers using a tile-by-tile blending method. See FIG. 20 for more details.

In an alternative embodiment, the precipitation blending program blends two or more input tile layers using an alternative image processing-based blending process that blends two or more input tile layers by first representing the input tile layers as images, for example by converting precipitation tile layer values to grayscale pixels, wherein the darkness of a pixel corresponds to a magnitude of the value of a precipitation estimate for the tile. The precipitation blending program then extracts objects from the images using one or more image processing techniques, morphs and blends the extracted objects from two or more input tile layers to generate a blended image, and translates pixels of the blended image to precipitation estimate values on a blended precipitation tile layer (8102). In an exemplary image processing-based blending process, the blending program weights the input forecasts based on accuracy improvement data and uses a weighted morphing blending algorithm to blend the input forecasts. The precipitation blending program saves the resulting NowCast forecast data to precipitation forecast database (325).

5.4.9.1 Forecast Blending Program (662)

The forecast blending program selectively blends two or more individual forecasts (i.e. multiple forecasts each generated by a different forecasting method, or members of a forecast ensemble) based on the calculated skill of the individual forecasts. The methods generate a blended forecast that includes data aggregated from at least two of the individual forecasts. The methods are particularly useful for blending multiple forecasts that each have relatively high skill for different portions of a forecast time range.

In one exemplary embodiment, the system calculates a skill of each forecast. In another exemplary embodiment the system receives, from forecast data providers, skill curves corresponding to input forecasts. The system saves skill curves for each forecast in a forecast skill database (355), indexed by forecast type. In another exemplary embodiment, the system uses a time lagged method to dynamically calculate and update skill metrics associated with each input forecast, for example by comparing forecast weather parameter values and radar-based weather parameter values and calculating a forecast skill value at each forecast time point. As forecast skill metrics are updated based on observations, the system updates corresponding skill curves and stores the updated skill curves in a forecast skill database. The system generates and updates skill curves using one or more known forecast skill or uncertainty metrics.

Forecast skill for a particular forecast method is affected by a number of factors including location, time of year, type of weather (e.g., isolated thunderstorm, steady snow), and input data source variability, reliability, and sensor or microwave link density. In an exemplary embodiment, the system and/or NWP model data providers pre-calculate multiple forecast skill curves, each corresponding to a different set of conditions. For example, a long range NWP model such as the GFS model has low skill under certain conditions such as when forecasting rapidly developing thunderstorms and relatively higher skill when calculating forecasts during steady weather conditions. The HRRR model, on the other hand, has relatively high skill under near term conditions and relatively low skill when calculating forecasts during long term weather events. In an exemplary embodiment the system selects a skill curve that corresponds to conditions at the beginning of forecast calculations, e.g., at $M_iF_0$ time stamp.

In a first exemplary implementation of a forecast blending program, the system executes the forecast blending program as part of forecast cycle processing. For example, to blend an internally generated forecast tile layer with a corresponding externally generated forecast tile layer during each forecast cycle iteration. In a second exemplary implementation of a forecast blending method, the system performs forecast blending during forecast post processing, for example blending an internally generated MiFj forecast stack with an externally generated, and optionally bias-corrected, MiFj forecast stack, such as a bias-corrected HRRR or GEFS forecast stack. In a particular exemplary embodiment of a forecast blending program, the system blends a calculated NowCast precipitation forecast with an externally generated forecast such as a forecast collected by the system from a NWP model data source (344).

An example embodiment supports blending of a plurality of forecasts. The system includes a forecast blending program that retrieves, from one or more system databases, forecast data from each of a plurality of forecasts (e.g. a stack of $M_iF_j$ forecast precipitation tile layers (2031) and a stack of bias-corrected ensemble forecast tile layers (2044)) and skill metric values or forecast blending weights corresponding to the retrieved input forecasts. The forecast blending program then blends data from the multiple input forecasts based on the skill level of each input forecast at each blended forecast time point to generate a stack of $M_iF_j$ blended forecast tile layers (2045). The output blended forecast data is saved to a blended forecast database (366). In one exemplary embodiment, at each forecast time point, the forecast blending program ranks the skill of each input forecast at that forecast time point. The forecast blending program uses the input forecast rankings to determine which input forecast or forecasts to use at each forecast time point. In one exemplary embodiment, the forecast blending program selects, for blending, forecast data from the highest ranked (i.e. most highly skilled) forecast at each time point. In another embodiment, the forecast blending program blends forecast data from two or more of the plurality of input forecasts using a blending algorithm weighted by forecast skill.

In a particular exemplary application of the methods, the forecast blending program aggregates data from an input NowCast forecast (e.g., a forecast generated/calculated by precipitation forecasting program (915)) and an input HRRR precipitation forecast to generate a blended forecast with improved quality or skill as compared to quality or skill of each of the individual input forecasts. In another exemplary embodiment, the forecast blending program aggregates data from an input NowCast with data from an external ensemble forecast, for example from a Global Ensemble Forecast System (GEFS) forecast. In a particular exemplary embodiment, the forecast blending program generates a bias- or bias-corrected ensemble forecast, as described herein, and blends data from an input NowCast forecast with data from the bias-corrected forecast.

Figure 13:
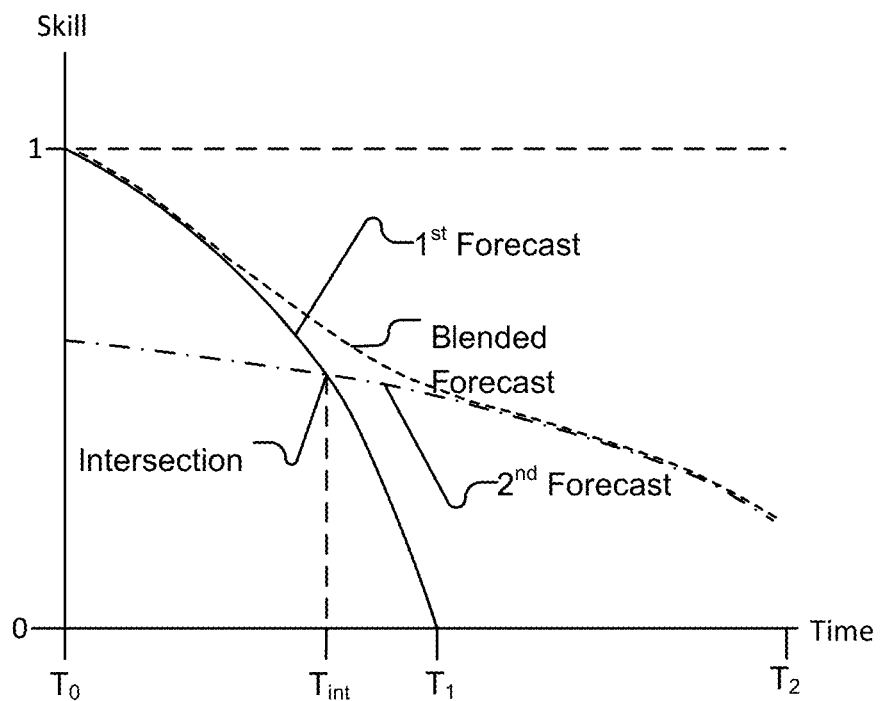
FIG. 13 depicts an exemplary first forecast skill curve and an exemplary second forecast skill curve.

An exemplary first forecast skill curve and an exemplary second forecast skill curve are illustrated in FIG. 13. First forecast skill at the beginning ($T_0$) of a forecast cycle is greater than skill of the second forecast but decays more rapidly than second forecast skill. The first forecast skill curve intersects the second forecast skill curve, at intersection time point $T_{int}$, and from $T_{int}$ to time point $T_1$, when first forecast skill i metric value is essentially 0, first forecast skill metric value is less than second forecast skill. An exemplary skill curve for a blended forecast created by selectively combining data from first and second forecast data sets is also shown in FIG. 13. Overall blended forecast skill is greater than that of either first forecast skill or second forecast skill alone.

The forecast blending program (662) blends multiple input forecasts using a weighted blending algorithm. At each forecast time point, the forecast blending program weights data from each input forecast based on forecast skill at the forecast time point. In this manner, for example referring to FIG. 13, the forecast blending program weights, at early forecast time points, when first forecast skill is high, blending to favor first forecast data. For example, at early forecast time points the forecast blending program populates blended forecast tile layers (2045) entirely, or almost entirely, with data from corresponding first forecast tile layers. The forecast blending program weights blending to favor data from second forecast tile layers at later forecast time points where first forecast skill is low. The second forecast is from a bias-corrected ensemble forecast, e.g., a bias-corrected GEFS forecast, and second forecast tile layers include data from a GEFS data source that has been transformed by the offline/background processing server to populate GEFS tile layers and corrected using data from one or more collected or generated collected observation weather parameter tile layers. The forecast blending program populates blended tile layers for time points close to and including the intersection of the first and second forecast skill trend lines with a mixture of data from both corresponding first forecast tile layers and corresponding second forecast tile layers and weights blending as a program of first and second forecast skill at each forecast time point.

In one example blending strategy, the forecast blending program, at forecast time points preceding $T_{int}$, weights the first forecast more highly than the second forecast, for example by including a greater proportion of first forecast data than second forecast data in blended tile layers. The forecast blending program weights the second forecast more highly than the first forecast at time points subsequent to $T_{int}$. Table 3 shows an illustrative example distribution of weighting from first and second forecast tile layers included in blended forecast tile layers at forecast time points surrounding and including the intersection of first forecast and second forecast skill curve at $T_{int}$. In this example, the forecast time increment is 10 minutes and the first forecast quality approaches zero 30 minutes after the first forecast/second forecast quality intersection.

TABLE 3

| Forecast | 1$^{st}$ Forecast % | 2$^{nd}$ Forecast % |
|---|---|---|
| $T_{int}$ − 30 min | 100 | 0 |
| $T_{int}$ − 20 min | 80 | 20 |
| $T_{int}$ − 10 min | 60 | 40 |
| $T_{int}$ | 50 | 50 |
| $T_{int}$ + 10 min | 40 | 60 |
| $T_{int}$ + 20 min | 20 | 80 |
| $T_{int}$ + 30 min | 0 | 100 |

In an exemplary embodiment, the forecast blending program uses one or more forecast blending techniques to blend forecast data from two or more input forecasts. In some exemplary embodiments, the forecast blending program uses a bias correction technique, for example object replacement or Fourier space bias correction, to blend elements of a high skill forecast, for example a precipitation NowCast generated/calculated by a precipitation forecasting program (915), with a NWP or ensemble forecast to generate a blended forecast. In this manner, the forecast blending program uses bias correction techniques to assess error or reduced skill in a forecast and to determine when and how to refresh the forecast.

In a first exemplary forecast blending program uses an image-processing based technique that includes weighted morphing wherein the system uses input forecast skill to adjust morphing weights. For example, the forecast blending program replaces objects in a NWP or ensemble forecast data with objects from a NowCast forecast.

A second exemplary forecast blending program blends forecasts using a Kalman filter with gain weighted based on forecast skill.

A third exemplary forecast blending program calculates a probability score that indicates the relative likelihood of data from each source forecast being correct. The system more heavily weights, for blending, the highest probability source forecast. A probability calculation is a function of forecast skill at a particular forecast time point.

A fourth exemplary forecast blending program uses one or more bias correction methods to blend components of forecast skill with a lower skill forecast. For example, the forecast blending program uses a Fourier transform to decompose images representing NowCast precipitation fields and ensemble precipitation fields into spectral space and then replaces ensemble phase with NowCast phase. In some embodiments, the forecast blending program replaces selected components of ensemble phase with NowCast phase. In further embodiments the forecast blending program replaces components of ensemble amplitude with NowCast amplitude.

A fifth exemplary forecast blending method uses equal blending weights, which cause the output forecasts to be the average of the input forecasts.

The forecast blending program calculates confidence in blended forecast data as a function of first forecast skill and second forecast skill at a blended forecast time point. The forecast blending program calculates increased confidence in blended data relative to that of both first and second forecast source data. In one exemplary embodiment, the forecast blending program determines a confidence in each forecast using a time lagged ensemble technique by comparing observations at a time point (t1), for example $M_iF_0$ blended precipitation estimates, to previously generated forecasts for the time point, for example $M_{i-1}F_j$ forecasted precipitation estimates where $M_{i-1}F_j$ forecast time point corresponds to $M_i$ cadence time stamp. The previously generated forecasts include multiple forecasts generated by each forecast model (e.g., by HRRR and NowCast models) during forecast cycle processing initiated at multiple previous time points. For example, a time lagged ensemble includes forecasts generated for t1 by three NowCast forecasts, initiated at t−1, t−2, and t−3.

When new processed data becomes available, the forecast blending program updates the blended forecast using the new data and increases confidence scores associated with the forecast. The system then propagates forecast updates and confidence increases through a forecast tile layer stack. In one exemplary embodiment, the previously calculated forecast is then discarded (released) and the system begins a new forecasting cycle using newly available data rather than continuing to update the previously calculated forecast. The system garbage collects released forecast data or may keep the released forecast data for other uses.

In a second exemplary embodiment, the previous forecast is retained as an ensemble member passed to a forecast blending program. In one exemplary embodiment the forecast blending program preferentially weights the retained previous forecast over other ensemble members. In other exemplary embodiments, the forecast blending program does not preferentially weight the retained previous forecast.

The system also uses newly available data to generate or update forecast skill metric values at each forecast time increment. For example, in one embodiment the system compares newly available precipitation processed data for a forecast time point to forecast precipitation estimates generated by multiple forecast methods and determines whether each forecast method performed according to associated skill metric values. If a forecast method performed better or worse than anticipated, the system adjusts an associated skill score for the forecast's skill metric values and forecast time point accordingly, and updates an associated skill decay curve. In other embodiments, the system incorporates newly calculated skill into a cumulative skill metric value that is continuously improved as the number of skill calculations comprising the aggregate skill metric values increases. The system iteratively updates skill metric values and skill curves as new processed data becomes available. These updates optimize future blending decisions using the updated skill curve.

Figure 14:
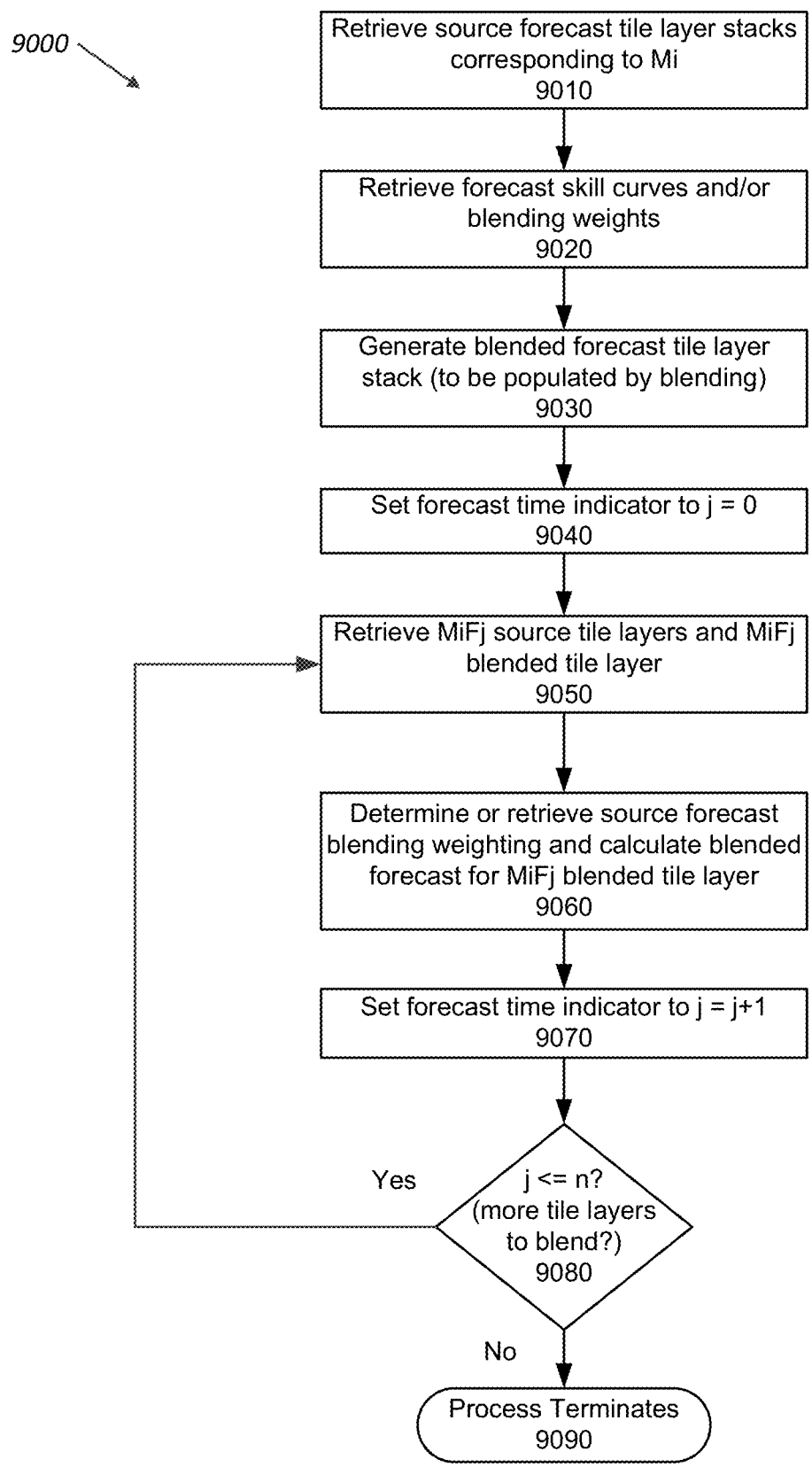
FIG. 14 illustrates an exemplary forecast blending method for blending two or more forecasts based on relative skill of each forecast at each forecast time step.

FIG. 14 illustrates an exemplary forecast blending method (9000) for blending two or more forecasts based on relative skill of each forecast at each forecast time step. The system includes a forecast blending program (662), operating on the modeling and prediction server that implements the forecast blending method (9000) to blend data from two or more source forecasts to generate a blended forecast tile stack $M_iF_j$ including forecast tile layers $M_iF_0$ through $M_iF_n$. Typically, each source forecast includes at least n forecast tile layers and in some embodiments include more than n forecast tile layers, in which case tile layers in excess of n are not used for blending.

At step (9010) the forecast blending program retrieves source tile layer stacks corresponding to blended forecast $M_i$ (i.e. source forecast tiles stacks with $M_iF_0$ timestamps equal to blended forecast $M_iF_0$). At step (9020), the forecast blending program determines conditions (thunderstorm, snow, etc.) at blended forecast $M_iF_0$ and retrieves source forecast skill curves and associated blending weights associated with the determined conditions.

At step (9030) the forecast blending program generates an empty blended forecast tile layer stack that includes one $M_iF_j$ tile layer for each blended forecast time from 0 to n.

At step (9040), the forecast blending program initiates the forecast blending process by setting blended forecast time indicator (j) to 0. At step (9050), the program retrieves $M_iF_j$ source and blended forecast tile layers.

At step (9060) the forecast blending program determines input forecast weighting based on skill and blends input forecasts to generate a blended forecast. In one exemplary embodiment, the forecast blending program retrieves blending weights that were pre-calculated and stored in a forecast blending weight database (358), as described in reference to FIG. 6. In an alternative exemplary embodiment, the forecast blending program dynamically calculates blending weights as a function of forecast skill. In a first exemplary embodiment the forecast blending program uses a weighted blending method to generate a blended forecast, e.g., by calculating a weight for each input forecast at each forecast timestamp. In a particular exemplary embodiment, the forecast blending program calculates a set of weights that sum to 1.0 at each forecast time stamp. In a particular exemplary embodiment, the forecast blending program uses a morphing or Kalman filter-based blending method, weighted based on input forecast skill. In a second exemplary embodiment, the ensemble forecast employs a dressing approach, e.g., Bayesian Model Averaging, to blend input forecasts.

In one embodiment, the forecast blending program selects a source data for each region of the $M_iF_j$ forecast tile layer. As previously discussed, the forecast blending program uses one or more criteria for selecting source data. For example, in one exemplary embodiment the forecast blending program selects, for a particular blended forecast region, source data from the forecast with the highest skill at $M_iF_j$ forecast time point. In another exemplary embodiment, the forecast blending program selects source data with the largest probability of being correct.

The forecast blending program associates a confidence score with each blended tile layer region and forecast. The confidence scores, in some embodiments, are a function of forecast skill of the selected source tile layer and, optionally, one or more additional source tile layers. The forecast blending program calculates confidence in blended forecast regions as a function of additional statistical measures associated with corresponding source forecast regions. For example, if the values of processed data from multiple source regions are in close agreement (e.g., if a standard deviation of a mean of the values is below a threshold amount), the system determines a higher confidence in the forecast data in a corresponding blended forecast region.

The forecast blending program iterates blending of all forecast tile layers by incrementing the blended forecast time stamp by 1 at step (9070), determining if there are additional blended forecast tile layers to select data for at step (9080) and, if so, returning to step (9050) to repeat the blending process. Otherwise, if all blended forecast tile layers have been populated with data, the process terminates at step (9090).

5.4.9.2 Exemplary Forecast Blending Data Flow

Figure 15:
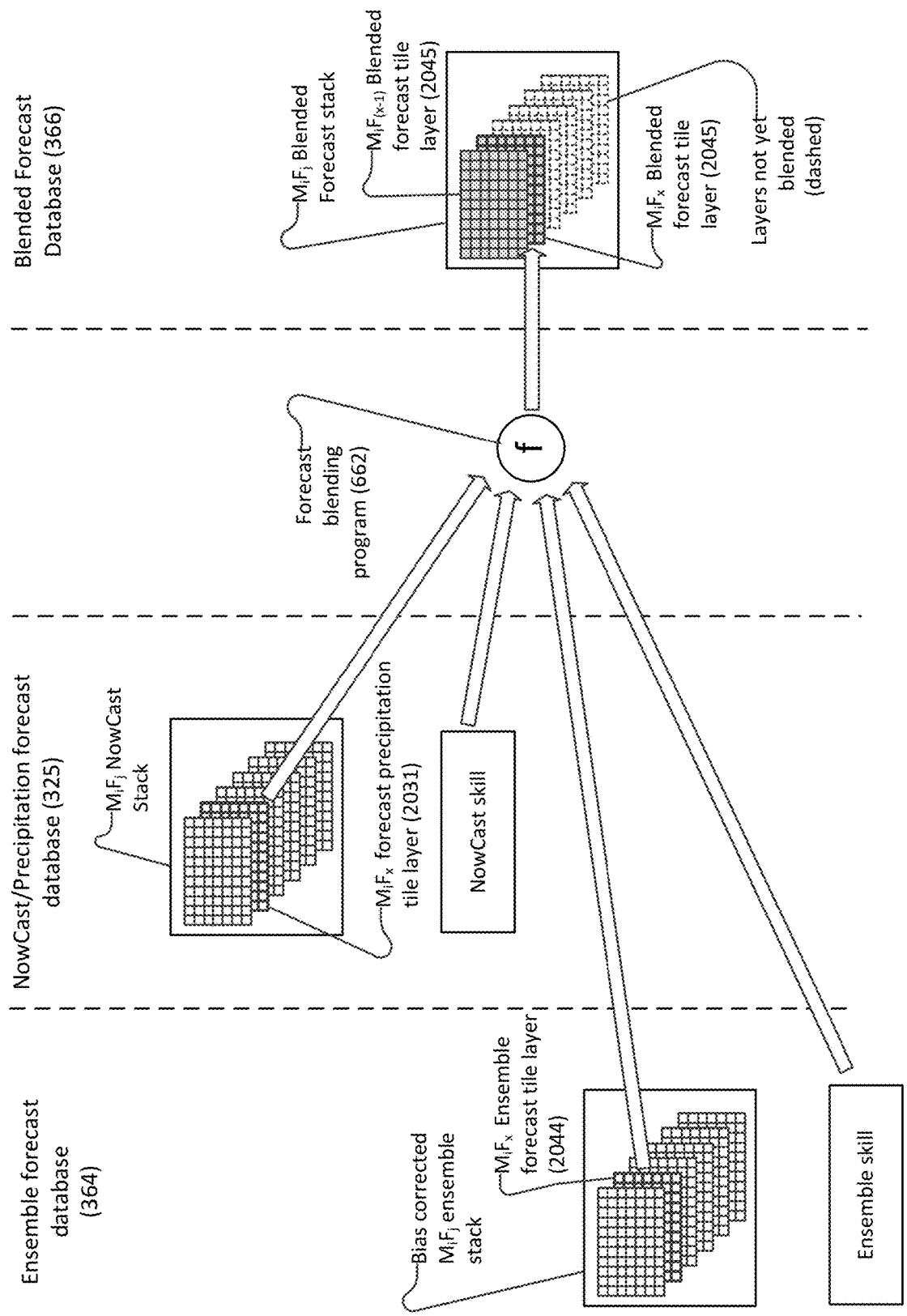
FIG. 15 illustrates exemplary information flow and processing in an exemplary embodiment of a forecast blending method.

FIG. 15 illustrates exemplary information flow and processing in an exemplary embodiment of a forecast blending method, in which one iteration wherein the forecast blending program blends ensemble and NowCast data from forecast time point (j=x) to populate $M_iF_x$ blended forecast tile layer. The program implements a forecast blending method like the method (9000) illustrated in FIG. 14, to blend a bias-corrected ensemble forecast with a NowCast forecast.

The forecast blending program generates a blended forecast stack, including $M_iF_j$ blended forecast tile layers. The forecast blending program then iterates steps (9050) through (9080) to populate the blended forecast stack with forecast data from the bias corrected ensemble forecast and the NowCast.

The forecast blending program (662) retrieves $M_iF_x$ Now-Cast tile layer and NowCast skill from a NowCast precipitation forecast database and $M_iF_x$ ensemble tile layer and ensemble forecast skill from an ensemble forecast database. In an alternative embodiment, the forecast blending program retrieves pre-calculated forecasts blending weights from a blending weight database. In a further alternative exemplary forecast blending method, rather than using pre-calculated forecast skill or forecast blending weights, the forecast blending program dynamically calculates forecast blending weights based on dynamically calculated forecast skill. The dynamically calculated forecast blending weights are based on a forecast skill core, generated by the forecast skill program, of an internally generated forecast, for example a forecast skill metric value of a NowCast generated by a precipitation forecasting program (915). In a particular example, the forecast skill calculation program produces a skill metric value for a specific NowCast forecast and the forecast blending program uses the skill metric value to dynamically calculate blending weights to generate, or update, a blended forecast during processing of the $M_{i+1}$ cadence instance.

5.4.10 Storm Tracking Program (932)

The storm tracking program processes collected, processed, and generated data, including radar reflectivity data, in order to extract and track storm object data. The program also calculates storm object motion data, including one or more motion fields and motion vectors, by comparing locations of storm objects extracted from a current cadence instance to locations of storm objects extracted during a previous cadence instance(s). The storm tracking program compares collected and processed $M_i$ and $M_{(i-1)}$ weather parameter data to determine $M_i$ motion vectors. The storm tracking program typically performs these calculations as part of the post-collection processing stage, however, the stage and timing of program execution is controlled by the cadence manager and its configuration. The program further geolocates extracted storm objects data relative to a map coordinate system, and associates the object data with cadence tiles and tile layers.

The storm tracking program uses image processing techniques to identify, classify, and track storms and storm objects. For example, in one exemplary embodiment, the storm tracking program applies image processing techniques to reflectivity data to identify shapes of regions of high intensity reflectivity corresponding to storms within $M_i$ and $M_{(i-1)}$ weather parameter data and to track the shapes between $M_i$ and $M_{(i-1)}$ measurement time points. Exemplary methods used by the storm tracking program to identify and track storms include optical flow techniques which the system uses to determine storm object motion vectors between current collected data and a historical weather parameter data and projects the motion vectors over time. The storm tracking program can use any suitable method to classify and track storms and storm objects.

In an exemplary embodiment, the program determines a mismatch between observed storm location and projected storm locations based on calculated vectors and adjusts motion vectors based on the mismatch to improve storm tracking. In an exemplary method, the storm tracking program retrieves, from the storm object database, $M_{i-1}$ storm objects and storm vectors calculated during a previous cadence interval an determines a projected location of $M_{i-1}$ objects at $M_i$ collection time by translating the $M_{i-1}$ storm objects using the $M_{i-1}$ motion vectors. The storm tracking program then compares the projected locations to $M_i$ observed storm object locations and updates motion vectors calculated using $M_i$ and $M_{i-1}$ storm object locations accordingly. The storm tracking program can also use a Kalman filtering approach as part of post-data collection processing and initial tile calculations to improve storm tracking accuracy for the forecasts of the Mi cadence cycle. In an example, the system combines, using a weighted average, a forecast storm location (e.g., $M_i$ forecast storm location calculated using $M_{(i-1)}$ storm location and motion vectors) with $M_i$ storm location calculated from the collected radar data in order to determine an adjusted $M_i$ storm location. Outputs of the storm tracking program include $M_i$ storm location and storm path data.

The program also manages associations between storm object data and cadence structures, such as specific tiles and/or tile layers that the storm effects.

Storm object data derived from the collected, processed, and generated data includes:

Storm shape
Storm size
Storm center, and storm center location
Storm motion fields/vectors
Storm path data (storm locations over time)
Storm initial conditions,
Radar reflectivity data associated with the storm object,
Associated storm intensity profile
Weather parameters associated with the storm when first identified (e.g. temperature, humidity, wind velocity and direction)
Associated tiles and tile layers (tiles and tile layers affected by this storm object) [for recalculation and propagation efficiency].

In some exemplary embodiments, the storm tracking program populates and maintains the storm object data in a storm objects database (350). In other exemplary embodiments the storm tracking program retains a copy of the storm object data in program memory to improve performance. In some exemplary embodiments, the storm objects and storm motion data calculated by the storm tracking program is saved in memory with a configurable time limit, for example for a pre-calculated time to live time (TTL) limit, and the data is cleared from memory, and saved to either the storm objects database (350) or the historical storm database (351) when the time limit has expired.

Figure 16:
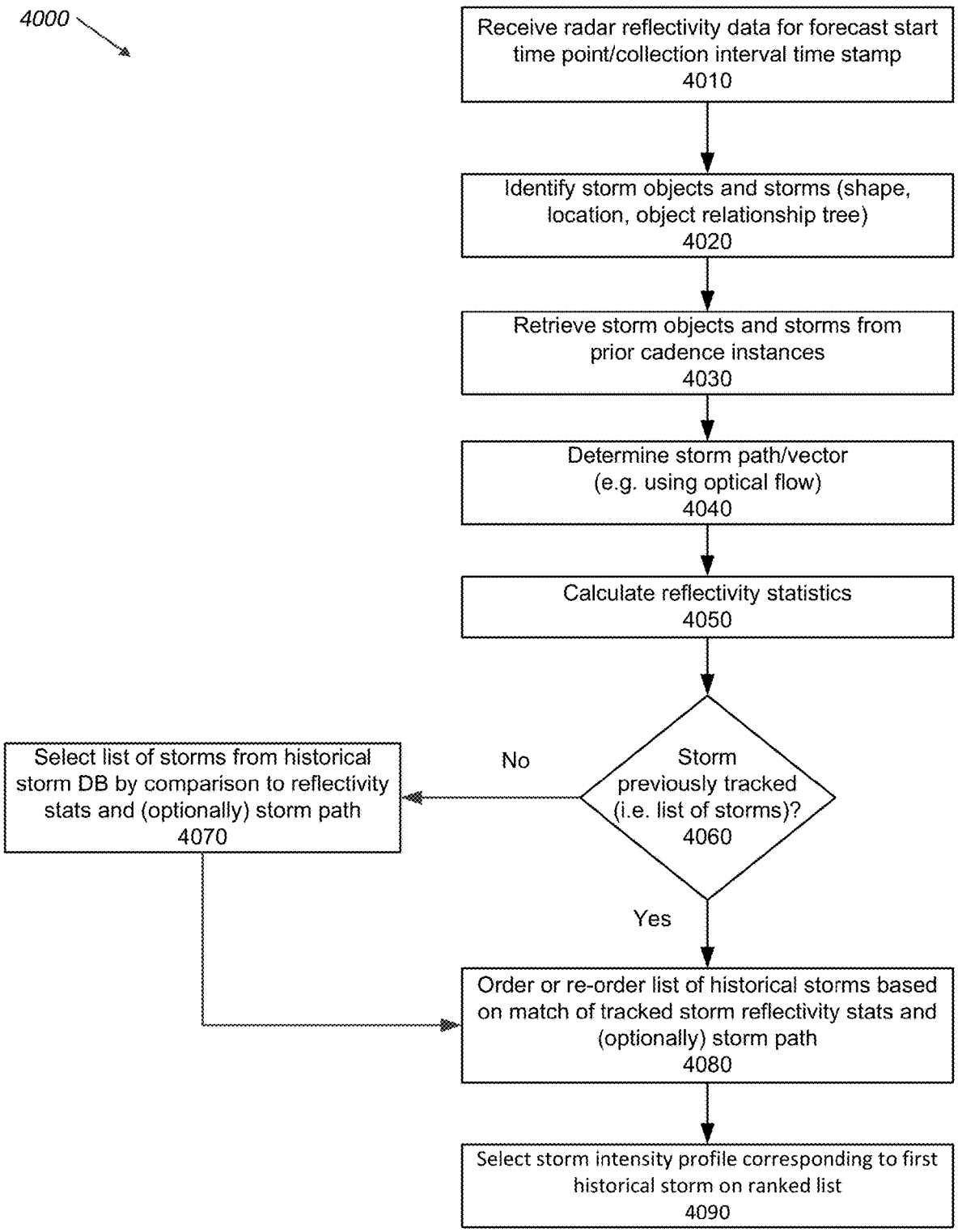
FIG. 16 is a flowchart depicting an exemplary method for selecting a storm intensity profile corresponding to a tracked storm.

Referring briefly to FIG. 16, an exemplar storm tracking program functionality is detailed in steps 4010 through 4050.

At step (4010), the program receives a $M_i$ radar reflectivity tile layer or composite reflectivity from radar database (322) that corresponds to a forecast start time represented by, for example, a cadence collection interval time stamp.

At step (4020), the program processes the radar reflectivity data to identify storms, storm objects, geolocations of storm objects, and spatial relationships between storm objects in a manner similar to that described in relation to step (2130) of method (2100).

At step (4030), the program retrieves data including storm objects and storms identified during one or more prior cadence cycles, for example $M_{i-1}$ associated storm objects. Maintaining storm object and storm motion data from multiple successive cadence cycles allows the program to rapidly perform storm tracking operations during cadence cycle processing (instead of having to preprocess historical radar information).

At step (4040), the program determines the storm paths or vectors based on current and previous storm and storm object locations, for example using optical flow techniques. The program saves the calculated storm paths or vectors of tracked storms to the storm object database.

At step (4050), the program converts a 2D reflectivity field comprising the storms and storm objects identified in the reflectivity data of the forecast start time point into statistical representations including average reflectivity, variance, and spatial variance of the field.

5.4.11 Storm Intensity Profile Selection Program (934)

The storm intensity profile selection program processes the storm object data (from the storm object database), along with current weather data in order to select a storm intensity profile and associate the selected storm intensity profile with the storm object. Typically, this association is made the first time a storm object is identified in the collected and processed data. In some instances, the selection and association process must be re-performed if forecasts have too much forecast error.

Figure 17:
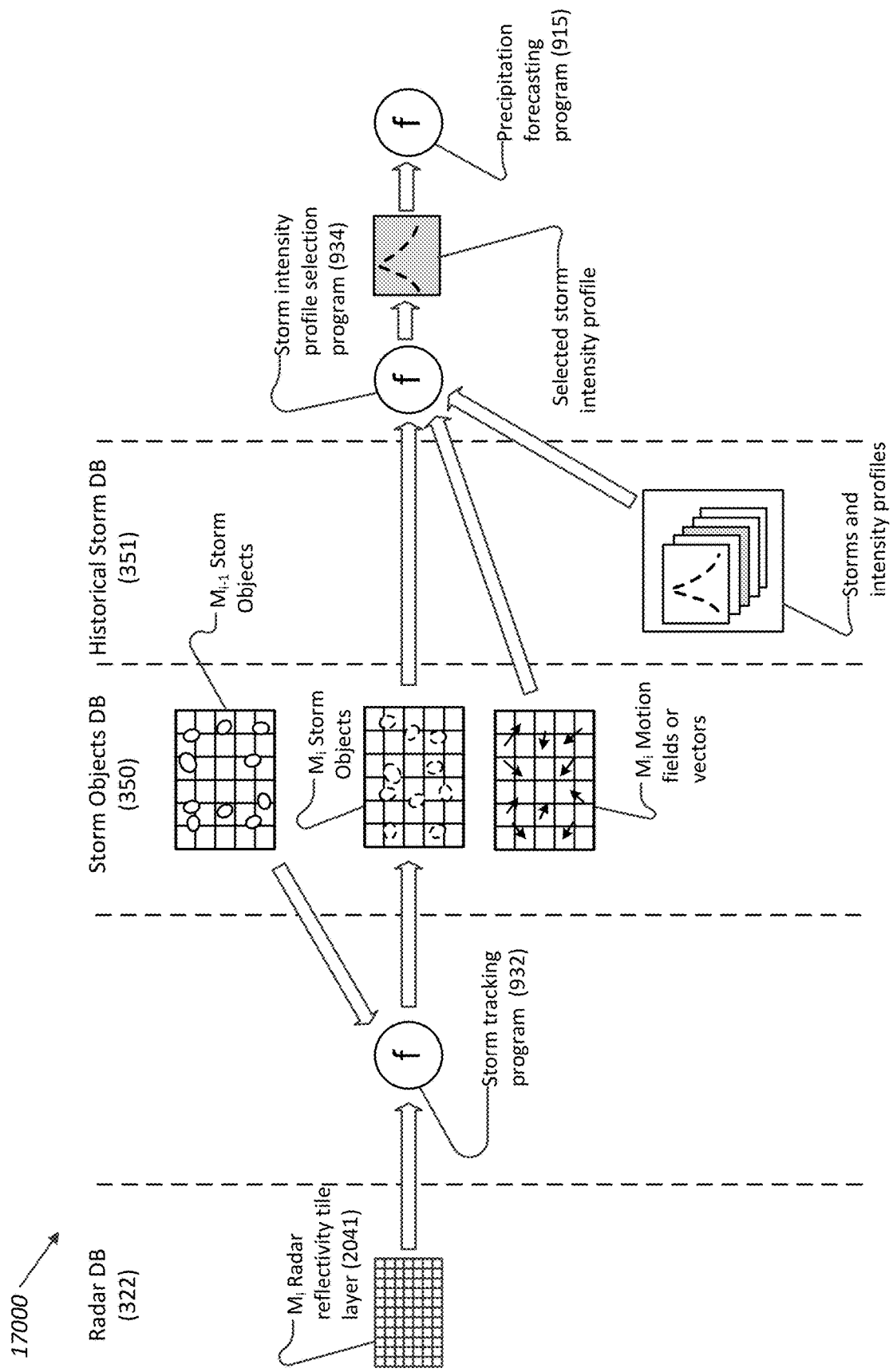
FIG. 17 depicts an exemplary storm intensity selection processing flow.

FIG. 17 illustrates an exemplary storm intensity selection processing flow (17000). The storm intensity profile selection program inputs $M_i$ storm objects and motion vectors, or motion fields, from the storm objects database. The storm intensity profile selection program processes the storm object and motion data to select a historical storm (or aggregated group of storms) and corresponding storm intensity profile from the historical storm database. A NowCasting or other forecasting program the selected storm intensity profile when producing a precipitation forecast.

The storm intensity profile selection program ingests data that represents characteristics associated with a currently tracked storm, e.g. $M_i$ storm objects and motion vectors and additional processed collected data such as, for example, $M_i$ temperature and humidity data. In some exemplary embodiments the storm intensity profile selection program ingests data collected or generated during earlier cadence intervals that include the tracked storm, for example $M_{i-1}, M_{i-2}, \ldots M_{i-n}$ collected data tile layers, storm objects, and/or storm motion data wherein tracking of the storm began at cadence instance $M_{i-n}$ or where n otherwise represents a configurable number of previous cadence instances. The storm selection program processes the ingested data to identify one or more historical storms (or blended storm groups) stored in the historical storm database with characteristics that match those of the currently tracked storm (e.g. identified storm type, storm path motion vector, and storm path geographic features). Based on the results of the matching, the storm intensity profile selection program selects a storm intensity profile to associate with the tracked storm object, and stores the association in the storm object database. The storm intensity profile selection program also selects, or calculates based on weather parameter data, a peak intensity and other intensity profile parameters and uses these parameters to scale the selected storm intensity profile.

In a first exemplary method for assigning a storm type, the storm intensity profile selection program defines a polygon representation of a storm object shape around a tracked storm object center and matches patterns of weather parameter data values from the polygon, such as air pressure and wind direction and velocity patterns. In a second exemplary method for selecting a storm intensity profile, the storm intensity profile selection program selects a historical storm based on how weather parameter data values change along a tracked storm path.

In an exemplary embodiment, the system includes an artificial intelligence or machine learning training program (678) configured to train a machine learning algorithm such as a deep neural net on historical storm data in order to generate a trained model for storm intensity profile association rules and an online classifier that implements the rules to classify a tracked storm and associate a storm intensity profiles. The machine learning algorithm is periodically retrained with updated weather parameter and storm object data along with calculated forecast errors associated with the storm object. A machine learning execution program (946) loads characteristics corresponding to a tracked storm and executes the trained model in order to determine storms that are similar in classification to the tracked storm and/or determine a storm intensity profile and peak intensity for the tracked storm. As the tracked storm evolves over time, the machine learning execution program iteratively loads updated characteristics of the tracked storm and re-executes the trained model in order to determine whether a selected storm intensity profile should be adjusted or replaced with a different storm intensity profile.

FIG. 16 depicts a flowchart illustrating an exemplary method (4000), performed in part by the storm tracking program (932) and storm intensity profile selection program (934) in order to track a current storm and to select a storm intensity profile corresponding to the tracked storm. While the storm intensity profile selection method is described in relation to radar reflectivity data, the system can implement the method to select a storm intensity profile by processing one or more alternative or additional weather parameter data fields, for example by processing precipitation data or blended precipitation data which includes precipitation data from two or more sources blended together.

Steps (4010) through (4050) are provided by the storm tracking program described above, which populate the storm object database with storm object information.

The storm intensity profile selection program retrieves storm objects and motion vectors corresponding to a current storm, either from the storm object database or directly from the storm tracking program. The storm intensity profile selection program determines matches between the storm being tracked and historical storms in the storm database based similarities between historical storm data recorded in the historical storm database and corresponding data associated with the tracked storm. In an exemplary embodiment, storm intensity profile selection program determines a match based on the spatial relationships between storm objects, similarities between calculated reflectivity statistics calculated from reflectivity fields, and (optionally) storm paths and geographic features associated with storm paths. At step (4060), the system determines whether the storm being tracked has previously been tracked by the system (i.e. whether the system has previously determined a list of historical storms corresponding to the tracked storm). If the storm has not previously been tracked, then at step (4070) the system selects, from the storm database, a group of historical storms that are similar to the tracked storm.

At step (4080), the system orders the list of historical storms based on a degree of similarity between reflectivity statistics of the tracked storm and reflectivity statistics of the storms on the ordered list. Alternatively, other measures of similarity involving the tracked storm weather parameters may be used to order the list.

At step (4090), the system selects a storm intensity profile corresponding to the historical storm at the top of the ordered list.

In a further embodiment (not shown), after reordering the list of historical storms in step (4080), the system calculates a similarity metric that represents a degree of similarity between the first historical storm on the ordered list and the tracked storm. If the degree of similarity is below a threshold amount, indicating that the tracked storm has diverged from the storms on the ordered list by greater than a threshold amount, the system returns to step (4070) to select a new or updated list of historical storms from the storm database.

The methods discussed in this document provide improved storm intensity profile selection methods over methods that rely on a single modeled value (i.e. CAPE magnitude) to discriminate between storm types. Further, the method can associate a storm object and its storm intensity profile with one or more tiles covered by a storm based on storm tracking calculations. These associations may be performed as part of forecast generation stage (or sub-stages), or alternatively, separately from the forecast generation stage processing. In this way, the step of comparing CAPE values to thresholds for each forecast tile is removed from the forecasting process, which can decrease forecast computational time and resources.

5.4.11.1 Exemplary Adjustment of a Selected Storm Intensity Profile

As new weather parameter data becomes available, for example as new $M_{i+1}$ processed collected and generated collected data becomes available during an $M_i$ forecast cycle processing, storm tracking results are updated and forecast error and skill metrics are optionally computed.

The system calculates the immediate forecast error for the forecast elements of a forecast. If the immediate forecast error exceeds the allowable forecast error for the specific type of forecast, the system flags the forecast cycle as having an error. The immediate forecast error values are optionally saved to the system database and associated with the forecast of the forecast cycle.

The system calculates the cumulative forecast error for a forecast set by adding the immediate forecast errors for each of the forecasts of a forecast set. The cumulative forecast error values are optionally saved to the system database and associated with the forecast set. The cumulative forecast error is compared against the cumulative allowable forecast error (a forecast specific configuration parameter) and if the cumulative forecast error exceeds the cumulative allowable forecast error, the entire forecast is flagged as having an error.

If the computed forecast error and/or skill metrics indicate that the forecast values differ from the collected/generated data by more than the allowable error, the storm intensity profile selection program (934) is used to modify one or more attributes of the previously associated storm intensity profile (or even associate a different storm intensity profile) based on the a calculated metric such as forecast skill or forecast error of the storm track, storm intensity, and/or forecast weather parameters.

In one exemplary embodiment, the storm intensity profile selection program determines that a selected storm intensity profile should be updated or replaced by comparing forecast skill metric values, calculated for a NowCast that has been adjusted using the selected storm intensity profile, and updates or replaces the selected storm intensity if the skill metric is less than a threshold value.

In some exemplary embodiments the storm intensity profile selection program adjusts values such as a peak magnitude of a storm intensity profile or reclassifies a tracked storm type. In an exemplary embodiment, the program retrieves forecast data and current collected data, calculates a forecast error metric representing accumulated forecast error (e.g., based on difference between forecast and collected data) and provides, or otherwise makes available, the accumulated forecast error metric to the storm intensity profile selection program. The storm intensity profile selection program uses the allowable error and the accumulated forecast error to determine whether (or how) to adjust a selected storm intensity profile. For example, if the accumulated error surpasses a threshold magnitude, the program determines that an initially selected storm intensity profile is to be associated with a different storm intensity profile. If the accumulated error is below the threshold magnitude, the program adjusts the selected storm intensity profile parameters rather than selecting and associating a different storm intensity profile.

If the storm intensity profile selection program determines that a storm intensity profile should be adjusted, the program changes one or more parameters of the storm intensity profile. In one example embodiment, the program implements a dynamically updating algorithm to alter the parameters of the storm intensity profile in order to shift the shape and/or peak of the storm intensity profile. In one exemplary implementation, if the storm intensity profile selection program recognizes that a storm initially classified as having a short tail actually has a longer tail, the program adjusts the parameters that control the shape of the corresponding storm intensity profile in order to make the storm intensity profile more closely model the actual storm intensity. Alternatively, the program adjusts parameters to "best fit" the storm intensity profile based on a magnitude of a forecast error. In other exemplary embodiments, the program employs a Bayesian scheme to incorporate new collected data into an algorithm for updating storm intensity profile parameters.

In a further exemplary method for selecting and adjusting a storm intensity profile associated with a tracked storm, the storm intensity profile selection program selects a group of two or more historical storms (from the historical storm database) that are similar to a tracked storm. This preselection reduces the scope of tracked historical storms. The program creates a similarity ordered list of the historical storms, where similarity is measured based upon the error between the historical storm(s) and the current tracked storm. For each subsequent cadence cycle, the program compares the tracked storm vs. the list of historical storms and determines, upon the basis of the calculated error, the historical storm that is behaving most like the tracked storm. The list of historical storms is reordered as needed (lowest error to top of list) based upon the calculated error between each historical storm and the current tracked storm. The current "top of list" historical storm (and its storm intensity profile) is used for each cadence cycles forecasting (e.g. NowCast forecasts).

5.4.12 Bias Correction Program (936)

Bias correction programs identify and correct forecast bias. Each type of bias being corrected is represented by a different bias correction program. The example programs disclosed herein provide bias identification and correction using specific methods. Other programs implementing differing bias identification and correction methods are anticipated within the scope of the invention. The use of a single bias correction method to a specific bias correction program is made for clarity purposes, in some implementations, a bias correction program that includes a plurality of bias identification and correction methods is envisioned. In the art, bias correction of measurement or forecast data includes correcting biases in the data caused by one or more factors, for example by a known or calculated measurement instrument offset. One example of such bias correcting is scaling a weather sensor measurement by −3 degrees F. if the weather sensor has a known bias of +3 degrees. As used in the examples discussed herein, bias correction of weather forecast data refers to correcting forecast bias using observational data, i.e. processed collected data.

The bias correction examples refer to correcting bias of various types of forecasts, including internally calculated forecasts and external ensemble and other NWP forecasts ingested by the system. In each of the bias correction methods discussed in this section, processed collected data refers to $M_i$ data e.g., a $M_i$ radar collected data tile layer or $M_i$ weather sensor collected data tile layer, etc., that is used to reduce or eliminate bias of the NWP forecast at a forecast time point corresponding to cadence instance $M_i$ timestamp. In these examples, a bias correction program (936) performs bias correction calculations by:

a) retrieving processed collected data (e.g. a radar reflectivity tile layer (2041) and other processed collected data tile layers) and forecast data (e.g. data from NWP forecast tile layer (2042), individual ensemble forecast tile layer (2044)) stored in the system database, b) calculating the forecast error between the processed collected data and the forecast data. The forecast error calculations differ by forecast type and forecast element types, e.g. the error for a precipitation forecast has very different forecast error than the storm track associated with a storm object. In addition, the configuration for the forecast error calculations defines the maximum magnitude of the allowable forecast error, e.g. an error that is small enough to not care about.

c) calculating the forecast bias from the calculated forecast error, d) executing a forecast bias correction program (938), which processes the forecast data using the calculated forecast bias, producing bias corrected forecast data associated with an $M_iF_j$ stack of forecast data tile layers, e) optionally propagates the forecast bias corrections to other forecasts using an update propagation program, f) optionally calculates a metric describing the skill of the starting forecast based, at least in part, upon the calculated forecast error, g) saves the bias corrected forecast data to a system database.

In some implementations, one or more forecasts of a forecast ensemble are operated upon by bias correction programs (by NWP bias correction program (936)) in order to correct bias of individual ensemble members, which are then optionally combined to produce a bias-corrected ensemble forecast.

In another exemplary embodiment, the system implements one or more bias correction methods to correct bias of individual ensemble forecast members and then combines the bias-corrected ensemble members using a forecast blending program in order to create an ensemble forecast comprising derived forecast data.

In other exemplary embodiments, the system uses a standard image cross-fade/dissolve/morph algorithm to blend the forecasts.

In some exemplary embodiments, the bias correction program calculates a confidence or quality metric for each bias corrected ensemble member and a forecast blending program that uses the calculated metrics when combining the ensemble members. The forecast blending program processes the input ensemble member forecasts, for example, using a combination algorithm weighted by forecast skill or bias, to produce one or more ensemble forecast tile layers (2044). The forecast blending program saves the combined ensemble forecast data to the ensemble forecast database (364).

In another exemplary embodiment, a bias correction program corrects bias in the output of the ensemble forecast process, for example from an external ensemble forecast data provider. The illustrated examples are applicable to both exemplary embodiments. In addition, the methods illustrated herein are not limited to ensemble forecast and is also used to correct bias of single-member NWP forecasts such as, for example, GFS and HRRR forecasts.

5.4.12.1 Exemplary Object Replacement Phase Bias Correction

In one exemplary embodiment, a bias correction program corrects phase bias of an ensemble forecast data by replacing objects in the ensemble forecast with objects from a source of processed collected data; for example, by replacing objects from ensemble forecast precipitation data with objects from radar precipitation data. The bias correction program reads processed collected data from a processed collected data database, for example $M_i$ radar precipitation tile layer (2040) from radar database (322), and forecast data from a forecast database, for example from NWP database (329), ensemble member database (362), or ensemble forecast database (364). The bias correction program identifies objects in both the processed collected data set (e.g., radar precipitation) and the ensemble forecast data set, for example using a known image-based object detection method, and correlates the objects in the two data sets. In this manner, the bias correction program determines objects in the current weather parameter data set that correspond to objects in the ensemble data set.

The bias correction program then replaces objects in the forecast data set with corresponding objects from the processed collected data set, for example by replacing objects in a forecast tile layer for a forecast time point corresponding to cadence instance $M_i$ time stamp with objects generated from $M_i$ radar reflectivity or precipitation tile layer. In one exemplary embodiment the bias correction program adjusts shapes of objects in the forecast data set to match those of corresponding objects in the processed collected data set or blend ensemble and current weather parameter data set object shapes using a known blending algorithm. In a particular exemplary embodiment, the bias correction program determines a subset of ensemble objects to replace with processed collected data objects, for example by determining that one or more of a particular forecast object's shape, position, and/or weather parameter value amplitude differs by more than a threshold amount from that of a corresponding processed collected data set object. In another example exemplary embodiment, the bias correction program limits object replacement to a set of forecast objects having particular characteristics, for example only replacing ensemble precipitation cells that are characterized by precipitation intensity or geospatial velocity greater than a threshold amount.

5.4.12.2 Exemplary Vector Shift Phase Bias Correction

In some exemplary embodiments, a bias correction program corrects forecast phase bias using a vector shift method. The bias correction program uses a known method to identify features in a processed collected data set, for example a collected radar reflectivity data set, and features in a forecast weather parameter data set, for example an ensemble forecast data set, and correlates the features between the two data sets. The correlated features include, for example, storms, storm cells, isotherms or isobars, and any other weather parameter region of interest. In one exemplary embodiment, the bias correction program represents the correlated features as objects in each data set.

The bias correction program then determines translation vectors to map features of the forecast data set to features of the processed collected data set. In one exemplary embodiment the bias correction program calculates, for each feature, a vector to move a centroid of a forecast feature to the geolocation of the centroid of a corresponding feature of the processed collected data set. The bias correction program calculates a set of vectors from forecast feature centroid locations to centroid locations of corresponding current weather parameter data set features. The bias correction program uses the calculated vectors to translate or warp features of the forecast data set, thereby correcting phase bias in the forecast.

Figure 18:
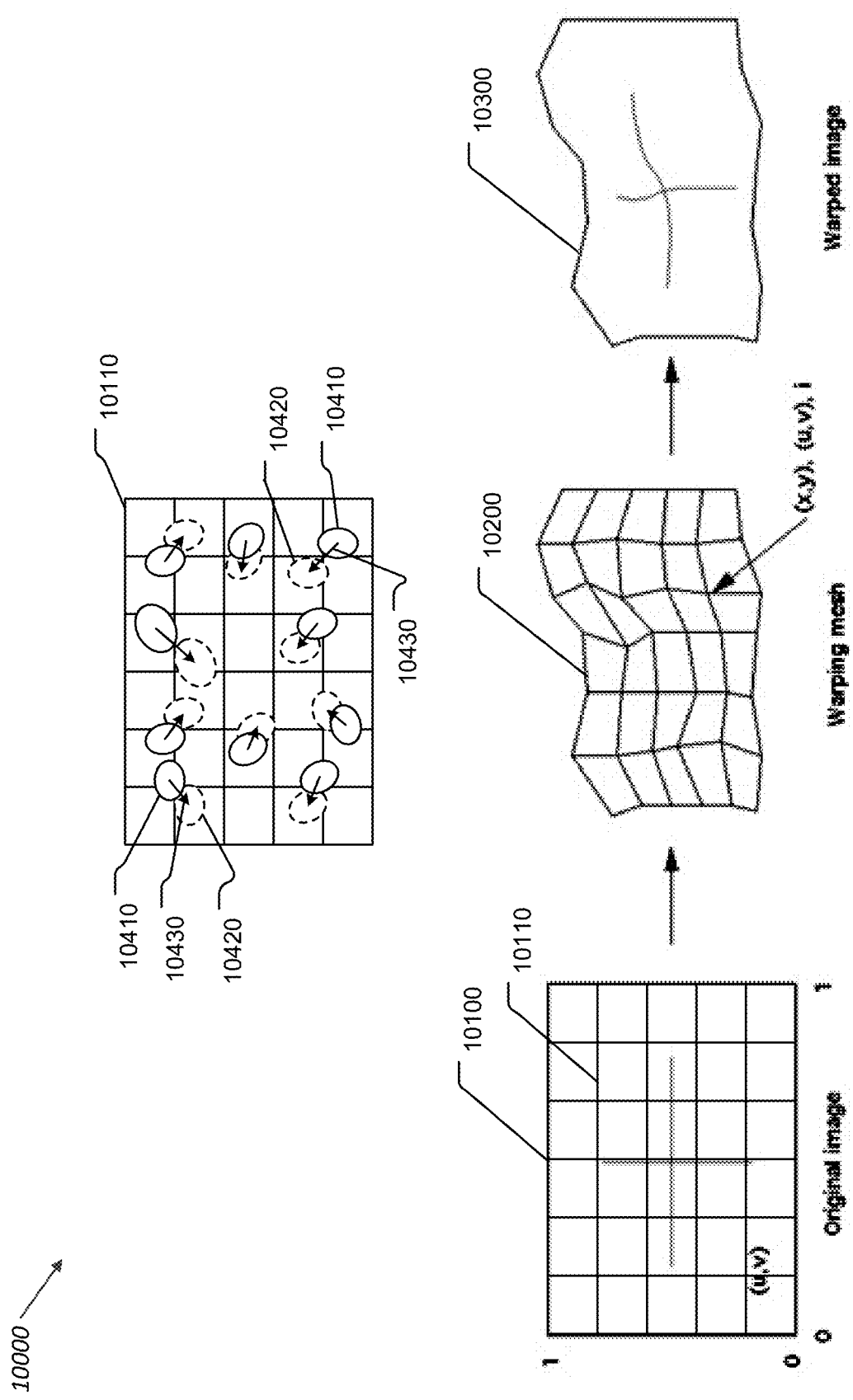
FIG. 18 depicts an exemplary method of bias correcting an ensemble forecast using the vector shift methods.

Referring to FIG. 18, an exemplary method (10000) of bias correcting a forecast, e.g., an ensemble forecast, using the vector shift method is shown. The ensemble forecast includes a forecast data set represented by an original image (10100) that encodes parameter values of a forecast tile layer represented as an the original ensemble image. For example, the original image (10100) is a representation of precipitation fields at a particular forecast time point.

The bias correction program calculates translation vectors (10430) to move objects in the ensemble original image (10410) to locations of corresponding objects (10420) in an image representation of a processed collected data set. The calculated translation vectors (10430) are used to morph or transform the original image (10100). The bias correction program applies the translation vectors to the original coordinate grid (10110) of the original image (10100) to generate warping mesh (10200), which includes a transformed set of the original grid coordinates (10110) of original image (10100). The bias correction program then interpolates values on the warping mesh (i.e. on the transformed coordinates) back to the original image mesh to generate warped image (10300). Warped image (10300) thus represents a bias-corrected version of the forecast data set represented by original image (10100). The bias correction program uses a warping mesh (10200) to bias correct (i.e. morph or transform) forecast images for each of multiple forecast time points.

5.4.12.3 Exemplary Fourier Space Phase Bias Correction

In an exemplary embodiment, the bias correction program corrects forecast phase bias, for example, bias of a NWP forecast or of an ensemble forecast, by implementing a Fourier space phase bias correction method which represents forecast data and processed collected data (e.g., radar reflectivity) as images and decomposes the images into spectral space using a Fourier transform. The bias correction program uses the Fourier transform to isolate the amplitude and phase of each of the forecast and processed collected data fields. In an exemplary embodiment, the bias correction program isolates amplitude and bias of a NWP or ensemble precipitation forecast and radar reflectivity or precipitation data fields.

The bias correction program replaces forecast phase values with processed collected data phase values in Fourier space while retaining the ensemble amplitude values/power spectra to generate a new set of Fourier elements corresponding to for the forecast. The bias correction program then transforms the new set of Fourier elements back into physical space using an inverse Fourier transform, thereby generating a phase corrected forecast, for example a phase corrected ensemble forecast.

At each forecast time point, the bias correction program isolates processed collected data and forecast data amplitude and ensemble phase values. In one exemplary embodiment the bias correction program replaces ensemble phase values with collected processed collected data, e.g. radar precipitation, phase values at an initial forecast time (t). At each of one or more subsequent forecast time point, the bias correction program extrapolates processed collected data phase values and replaces forecast phase values with extrapolated processed collected data phase at the forecast time point to generate a bias corrected forecast, for example a bias corrected ensemble forecast, at each forecast time point. A method, applicable to bias correcting ensemble forecasts, of Fourier space phase bias correction by replacing NWP model amplitudes with radar amplitudes is discussed in further detail in Radhakrishna, Zawadzki, and Fabry, "Post-processing Model-Predicted Rainfall Fields in the Spectral Domain Using Phase Information from Radar Observations" American Meteorological Society (2013), incorporated herein by reference.

In some exemplary embodiments, the system includes a bias correction program that implements a machine learning scheme, for example a statistical learning system method, to determine components of processed collected data or forecast phase and/or amplitude that are useful for correcting bias of one or more forecasts. The determined components are used by a bias correction program operating on the modeling and prediction server to bias-correct forecasts. For example, in one exemplary embodiment, a ML training program (678) trains a ML model, using ML training data generated from historical forecast and, in some embodiments, observation data retrieved from the historical storm database (351), to recognize components of phase and/or amplitude that are useful for correcting forecast bias.

In a particular exemplary embodiment, the ML training program trains the ML model to determine components of NowCast phase and amplitude that are useful for bias-correcting ensemble and NWP forecasts. While operating to correct bias in a NWP forecast, an online machine learning model execution program (946) executes the trained machine learning model using the NWP forecast to be bias corrected and corresponding NowCast forecast to determine components of NowCast phase and amplitude that are useful for bias-correcting ensemble and NWP forecast. In another exemplary embodiment, an offline machine learning model execution program (646) operating on the offline/background processing server executes the trained machine learning model to determine the components. A bias correction program operating on the modeling and prediction server performs bias correction of the NWP forecast using the components of NowCast phase and/or amplitude that are determined to be useful for bias correction.

In another exemplary embodiment, a ML model is trained to recognize components of phase and/or amplitude of processed collected or generated collected data, for example blended precipitation or radar reflectivity fields, that are useful for bias correction of a forecast and an online or offline machine learning execution program executes the trained ML model to determine, for a particular forecast, components of corresponding generated collected or processed collected data to be used by a bias correction program for correcting bias in the particular forecast.

In an exemplary embodiment, the ML training program retrieves an untrained bias correction model, for example a Fourier space bias correction ML model, from the ML model store, retrieves ensemble forecast data and corresponding NowCast forecast data from the historical forecast archive database (354), and trains the bias correction model using the forecast data. For example, the ML training program trains a Fourier space bias correction ML model to recognize components of NowCast data phase or amplitude that are useful for bias correcting ensemble forecast data.

5.4.13 Tile Layer (Forecast) Bias Correction Program (938)

Figure 19:
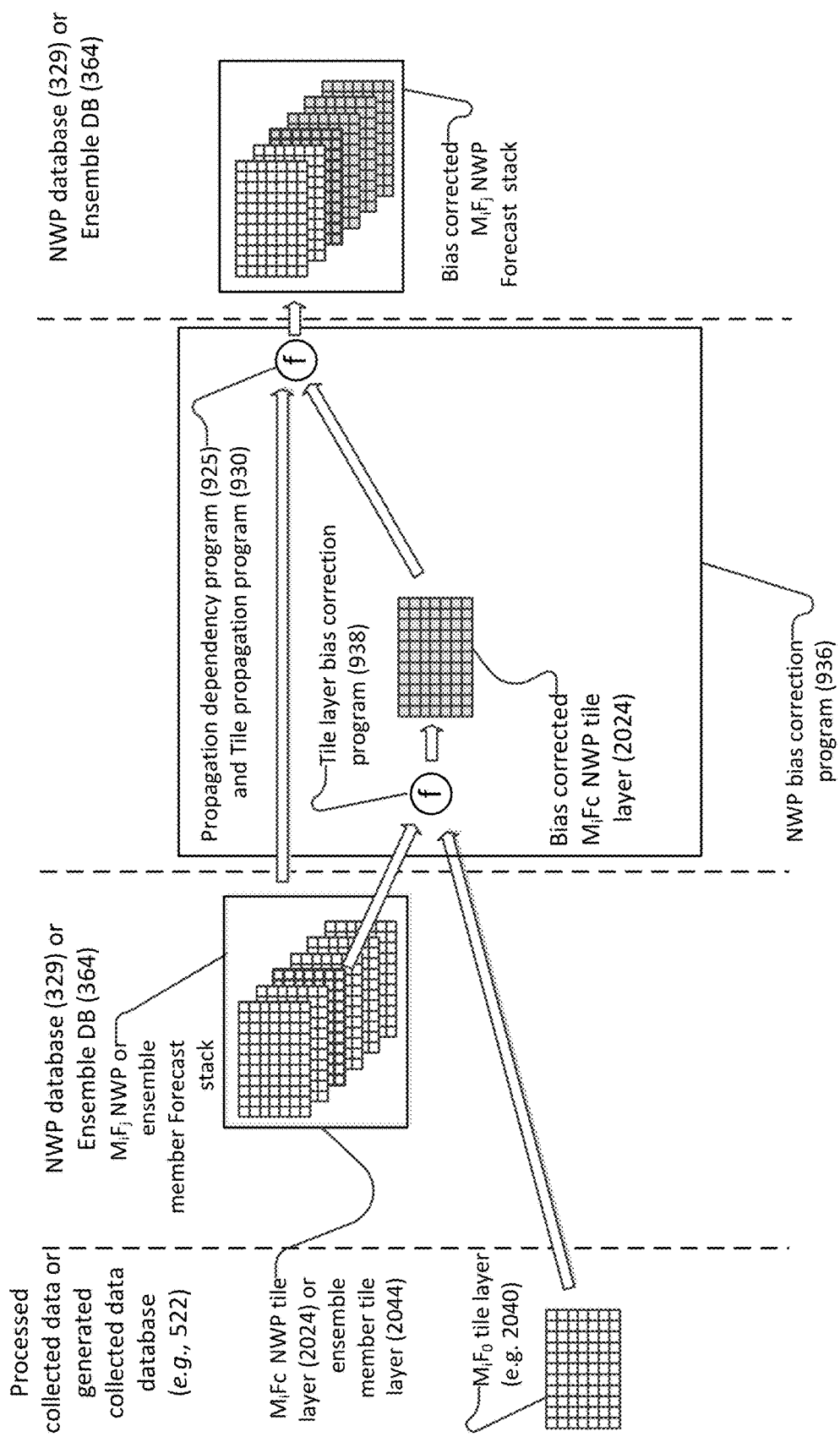
FIG. 19 illustrates an exemplary data flow for correcting bias of a single NWP forecast.

FIG. 19 illustrates an exemplary data flow for correcting bias of a single NWP forecast or an individual ensemble member forecast by correcting bias of a single tile layer. A bias correction program (936) includes a tile layer bias correction program (938) and an optional update propagation program (not shown). The bias correction program corrects bias in a first NWP forecast tile layer (2024) or ensemble member forecast tile layer (2044) at a first forecast time point and the update propagation program updates one or more additional forecast tile layers corresponding to later forecast time points by propagating bias correction changes from the first tile layer to the additional tile layer.

The tile layer bias correction program eliminates or reduces bias of forecast data from a single forecast time point corresponding to the collection time stamp of a cadence cycle instance $M_i$. The tile layer bias correction program retrieves a processed collected data tile layer (2040) (e.g. radar precipitation) at timestamp=c and NWP or ensemble member forecast data ($M_iF_c$ forecast tile layer (2024 or 2044) where c corresponds to time stamp of collected data). It processes the input data using a bias correction algorithm to bias correct a forecast tile layer corresponding to the collected data time stamp. The program produces a bias corrected NWP or ensemble member forecast tile layer with a forecast time point corresponding to collected data time stamp.

The program corrects bias using one or more of the bias correction methods as discussed herein. The program retrieves a processed collected data or generated collected data tile layer from a Collection Data Stack $M_i$, for example, a radar precipitation or reflectivity tile layer. The tile layer bias correction program determines a forecast time point (c) of Forecast Stack $M_iF_j$ that corresponds with the collection data stack collection time stamp retrieves $M_iF_c$ NWP tile layer. The tile layer bias correction program uses the current collected data tile layer to bias correct the NWP or ensemble member tile layer, thereby producing a bias corrected $M_iF_c$ NWP or ensemble member tile layer. The update propagation program then propagates updates from the bias corrected $M_iF_c$ NWP or ensemble member tile layer to each $M_iFj$ NWP tile layer with a forecast time point subsequent to $M_iF_c$ NWP tile layer, thereby generating bias corrected $M_iF_j$ NWP or ensemble member forecast stack.

The propagation dependency program and tile propagation programs (as described in European Patent Application Serial No. WO2019126707A1) are used to propagate changes within the forecast tile layers. The exemplary bias correction method is superior to known methods in that it allows the system to use the most recent, i.e. $M_i$, collected data to rapidly bias correct a NWP forecast including bias correcting the forecast at forecast time points for which data has not yet been collected. It further enables the system to blend a $M_iF_j$ NowCast with NWP forecast data that has been bias corrected with $M_i$ collected data. In a first exemplary implementation, the program performs bias correction as a forecast pre-processing step. In a second implementation, the bias correction program performs bias correction in parallel with forecast cycle processing.

5.4.13.1 Exemplary Bias Correction of NWP and Ensemble Member Forecasts

This section describes methods implemented to correct individual numerical weather prediction (NWP) model forecast biases, including ensemble forecast bias, and biases of individual ensemble members. The system implements one or more bias correction methods to correct phase, amplitude, positional, areal and/or intensity bias of a forecast.

In a first exemplary embodiment, the system implements bias correction methods to correct bias of individual NWP forecasts, for example phase bias of an HRRR forecast using one or more phase bias correction methods and corrects amplitude bias of the HRRR forecast using one or more amplitude bias correction methods.

In a second exemplary embodiment, the system implements bias correction methods to correct bias of each member of an ensemble forecast, following which the system optionally blends or otherwise combines the bias-corrected ensemble members to generate a bias-corrected ensemble forecast. In a particular exemplary embodiment, the system implements one or more bias correction methods to correct bias of a Global Ensemble Forecast System (GEFS) forecast which includes forecast outputs from multiple individual Global Forecast System (GFS) ensemble member forecasts.

In various embodiments, the bias correction programs correct bias using one or more of processed collected data (e.g., precipitation from a weather sensor data source), generated collected data (e.g., precipitation data calculated by the system based on collected data, for example based on collected radar reflectivity data).

In an exemplary embodiment, the tile layer bias correction program (938) includes or is associated with an instance of an online ML model execution program (946) configured to retrieve and execute a trained bias correction machine learning model or algorithm. In a particular exemplary embodiment, a bias correction program retrieves and executes a trained ML model that is configured to recognize components of NowCast phase and amplitude that are useful for bias-correcting ensemble forecasts.

Figure 20:
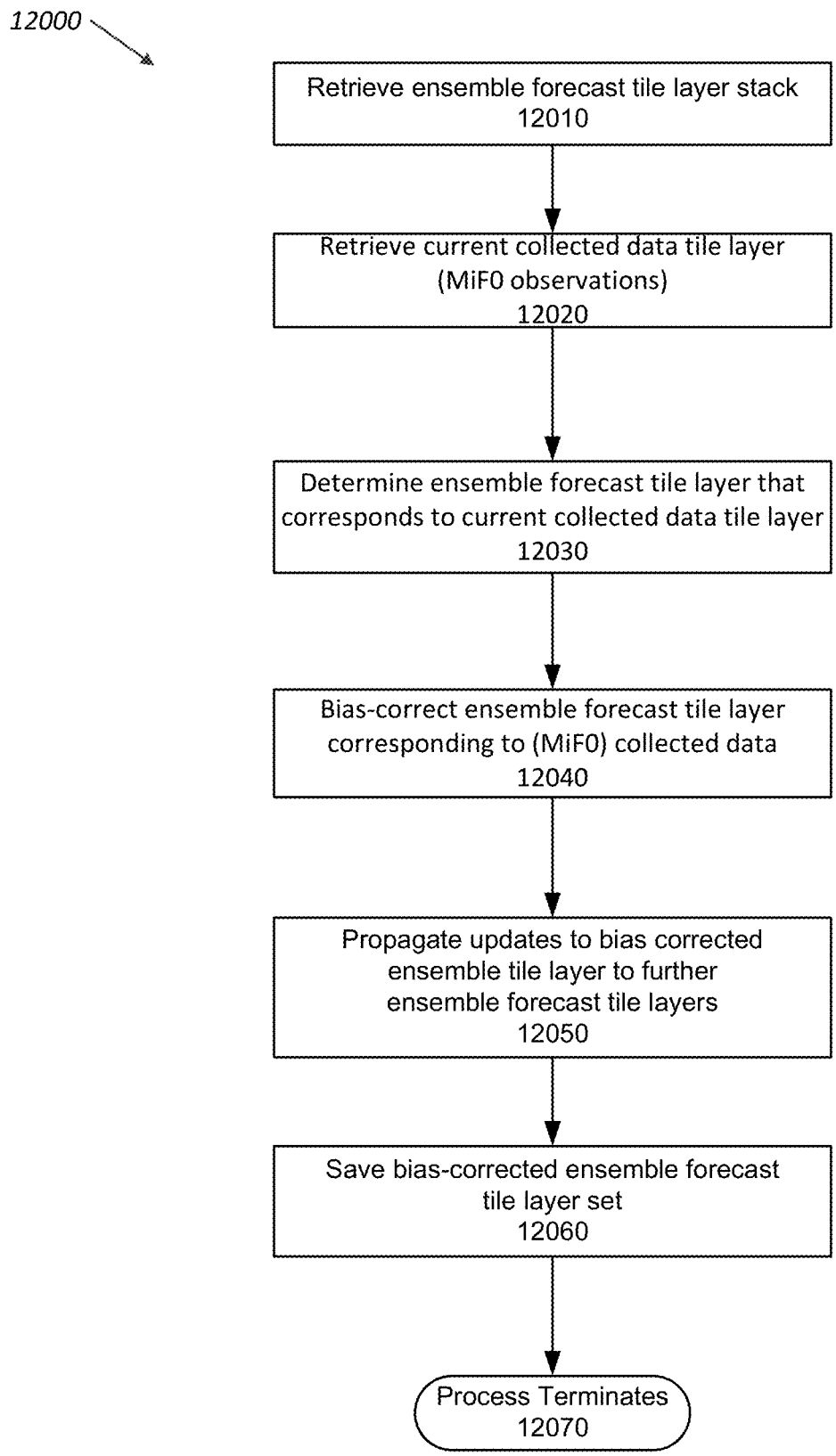
FIG. 20 illustrates an exemplary method for bias correcting an ensemble forecast.

FIG. 20 illustrates an exemplary method (12000) for bias correcting a single NWP forecast (e.g. an HRRR forecast or an ensemble member of a GEFS forecast). When implementing the method, the bias correction program corrects bias in NWP forecast data from a forecast time point that corresponds to a current processed collected data time point, for example a forecast time point that corresponds to the cadence time stamp of cadence instance $M_i$. An update propagation program is used to propagate changes in the bias-corrected forecast data to ensemble forecast data from further forecast time points, i.e. to forecast time points following the current data time point to generate a bias-corrected ensemble forecast data set.

At step (12010) the bias correction program retrieves a NWP forecast tile layer stack, for example a NWP precipitation forecast tile layer stack or ensemble member forecast tile layer stack, from a system database. The NWP forecast tile layer stack includes e forecast data that the system receives from a NWP forecast data source, for example from the NOAA which supplies HRRR and GEFS forecast data, and processes to populate an ensemble forecast tile layer stack for the current cadence instance.

At step (12020) the bias correction program retrieves a current processed collected data tile layer, for example a precipitation tile layer collected during the most recent cadence cycle (i.e. $M_i$ precipitation).

At step (12030) the bias correction program determines a NWP forecast tile layer that corresponds to the current processed collected data tile layer. For example, the program determines ensemble NWP forecast precipitation layer for a forecast time point that corresponds to a collection time stamp of the current precipitation collected data tile layer. In some exemplary embodiments, the bias correction program determines an ensemble forecast precipitation layer that has a forecast time stamp that is closest to the current data collection time stamp.

At step (12040) the bias correction program implements a bias correction method to bias correct the ensemble forecast tile layer determined in step (12030) using the current collected data tile layer. In various exemplary embodiments, the bias correction program performs bias correction using one or more of the amplitude and phase bias correction methods as described herein. In other exemplary embodiments, the bias correction program corrects the forecast tile layer using one or more alternative collected data-based correction methods. In a particular exemplary embodiment, the system uses a tile layer comparison program (as described in PCT Patent Publication No. WO2019126707A1) to identify one or more regions of the ensemble forecast layer that differ from corresponding regions of the current collected or generated collected (i.e. observation) tile layer(s) by more than a threshold amount. The system then uses an update program to replace data in the identified of the ensemble forecast tile layer with data from corresponding regions of the current observations tile layer.

At step (12050) the system propagates changes in the bias-corrected ensemble forecast tile layer to ensemble forecast tile layers for forecast time points following that of the bias or collected data corrected tile layer. In a particular exemplary implementation, a propagation dependency program identifies regions of further forecast time point tile layers that should be updated and propagates the updates to the identified regions. A stack of bias corrected forecast tile layers includes an initial bias corrected forecast tile layer at a forecast time point corresponding to processed collected data collection time stamp. The bias corrected tile layer includes tile layers for forecast time points following the processed collected data collection time stamp that include updates propagated from the initial bias corrected forecast tile layer.

At step (12060), the bias correction program saves the bias or collected data corrected ensemble forecast to a system database, after which the process terminates (12070).

The system bias corrects an ensemble forecast by iteratively performing method (12000) to correct bias of one or more ensemble members (e.g., to bias correct all ensemble members or to bias correct those bias members having a skill metric value below a bias correction threshold value), and then optionally blending or otherwise combining the individual ensemble members to generate a bias corrected ensemble forecast. In some embodiments, the bias correction program also calculates a metric for each forecast ensemble member that the forecast blending program uses when combining forecast ensemble members (e.g. confidence score). The program produces multiple bias corrected ensemble forecasts; which are saved to the ensemble member database (362).

5.5 Conclusion

It will also be recognized by those skilled in the art that, while the technology has been described above in terms of preferred embodiments, it is not limited thereto. Various features and aspects of the above described technology may be used individually or jointly. Further, although the technology has been described in the context of its implementation in a particular environment, and for particular applications, those skilled in the art will recognize that its usefulness is not limited thereto and that the present technology can be beneficially utilized in any number of environments and implementations where it is desirable to improve the accuracy and timeliness of precipitation forecasts. Accordingly, the claims set forth below should be construed in view of the full breadth and spirit of the technology as disclosed herein.

What is claimed is:

1. A method for processing an ensemble of forecasts, comprising:
    obtaining, from a data source, at least a first weather parameter forecast,
    encoding the first weather parameter forecast as a first weather forecast within a current temporal cadence instance,
    using a second weather forecast comprising at least a second weather parameter forecast, and a forecast skill comprising a hindsight metric of forecast quality, executing, with a processor, forecast blending instructions to blend the first and second weather parameter forecasts to produce a blended weather forecast, and
    with the processor, storing the blended weather forecast in a memory in association with a temporal cadence instance.

2. The method of claim 1 further comprising using the blended weather forecast in a weather product.

3. The method of claim 1 wherein executing the forecast blending instructions is based at least in part upon a first skill metric associated with the first weather forecast and a second skill metric associated with the second weather forecast.

4. The method of claim 3 further including using the blended weather forecast in a weather product.

5. The method of claim 1, further including calculating the second weather forecast.

6. The method of claim 1 further including reading the second weather forecast from a forecast data source.

7. A system for processing an ensemble of forecasts, comprising:
    a memory that is configured to store at least a first weather parameter forecast, and
    a processor operatively coupled to the memory, the processor executing instructions to perform operations comprising:
        encoding the first weather parameter forecast as a first weather forecast within a current temporal cadence instance,
        using a second weather forecast comprising at least a second weather parameter forecast and a forecast skill comprising a hindsight metric of forecast quality, blending the first and second weather parameter forecasts to produce a blended weather forecast, and
        storing the blended weather forecast in the memory in association with a temporal cadence instance.

8. The system of claim 7 wherein the processor is further configured to use the blended weather forecast in a weather product.

9. The system of claim 7 wherein the processor is further configured to base the blending at least in part upon a first skill metric associated with the first weather forecast and a second skill metric associated with the second weather forecast.

10. The system of claim 9 wherein the processor is further configured to use the blended weather forecast in a weather product.

11. The system of claim 7 wherein the processor is further configured to calculate the second weather forecast.

12. The system of claim 7 wherein the processor is further configured to read the second weather forecast from a forecast data source.

13. A method for improving a weather forecast, comprising:
obtaining, with a processor, historical collected, processed collected, or generated data associated with one or more weather parameters, the historical collected, processed collected, or generated data representing a plurality of past states of physical weather parameters,
obtaining, with the processor, a forecast associated with a temporal cadence instance relating to the time and location of the historical data,
with the processor, associating forecast weather parameters with corresponding weather parameters in the historical collected, processed collected, or generated data, and
with the processor, calculating a forecast error between a current forecast and each of the corresponding weather parameters to provide a forecast skill comprising a hindsight metric of forecast quality.

14. The method of claim 13, further comprising calculating, with the processor, a bias between the forecast and historical collected, processed collected, or generated data.

15. The method of claim 14, further comprising adding or subtracting the calculated bias to a current forecast in order to adjust one or more forecast weather parameters.

16. The method of claim 13, wherein the plurality of past states of physical weather parameters are associated with a storm track.

17. The method of claim 13, wherein the plurality of past states of physical weather parameters are associated with a storm intensity profile.

18. The method of claim 13, wherein the plurality of past states of physical weather parameters are associated with calculated weather data.

19. A system for improving a weather forecast, comprising:
a memory that stores historical collected, processed collected, or generated data associated with one or more weather parameters, the collected, processed collected, or generated data representing a plurality of past states of physical weather parameters, and
a processor operatively coupled to the memory, the processor executing instructions that control the processor to perform functions comprising:
obtaining a forecast associated with a temporal cadence instance relating to the time and location of the historical collected, processed collected, or generated data,
associating forecast weather parameters with corresponding weather parameters in the historical collected, processed collected, or generated data, and
calculating a forecast error between a current forecast and each of the corresponding weather parameters in the historical collected, processed collected, or generated data to provide a forecast skill comprising a hindsight metric of forecast quality.

20. The system of claim 19, wherein the processor is further configured to calculate, with the processor, a bias between the forecast and the historical collected, processed collected, or generated data.

21. The system of claim 20, wherein the processor is further configured to add or subtract the calculated bias to a current forecast in order to adjust one or more forecast weather parameters.

22. The system of claim 19, wherein the plurality of past states of physical weather parameters are associated with a storm track.

23. The system of claim 19, wherein the plurality of past states of physical weather parameters are associated with a storm intensity profile.

24. The system of claim 19, wherein the plurality of past states of physical weather parameters are associated with calculated weather data.

25. A method comprising:
(a) processing, with a processor, a plurality of radar images to identify a storm;
(b) with the processor, determining a storm intensity and a motion vector of said identified storm:
(c) repeating (a) and (b) for multiple storms to develop a data set; and
(d) using the data set and machine learning to predict the storm intensity and motion vector of a current storm.

26. A distributed system for generating weather forecasts comprising:
an information collection and normalization server;
a modeling and prediction server;
an offline/background processing server executing an artificial intelligence or machine learning training program configured to train a machine learning algorithm on historical storm data retrieved from a historical storm database, the offline/background processing server being configured to use a trained neural network to calculate a probability of a forecast event being rain, mist, or fog based upon past historical weather data combined with current collected and forecast generated data; and
an information distribution and alerting server.

27. A method for processing weather storm information, comprising:
reading from a weather radar data source, a first radar reflectivity image of a radar scan,
processing the first radar reflectivity image to produce one or more first storm objects, each having a shape and a location determined from the first radar reflectivity image,
processing the first radar reflectivity image to produce a storm profile based upon the first radar reflectivity image, the storm profile being associated with the one or more first storm objects,
associating the one or more first storm objects with one or more tiles of a tile layer of a temporal cadence instance, and
saving data of the one or more first storm objects and associations in a database.

28. The method of claim 27 further comprising:
reading a second radar reflectivity image from a weather radar data source, the second radar reflectivity image associated with a time later than the first radar reflectivity image,
processing the second radar reflectivity image to produce one or more second storm object each having a shape and a location determined from the second radar reflectivity image,
associating the one or more second-storm objects with the one or more first storm objects produced by processing the first radar reflectivity image,
computing a storm track for the storm object(s) based upon difference in location between the associated first and second storm objects,
associating the one or more second storm objects with one or more tiles of a tile layer of a cadence instance, and storing data of the one or more first storm objects and associations in a database.

29. The method of claim 28, further comprising:
creating a first set of forecast weather parameters, based in part upon the stored storm object data,
associating the first set of forecast weather parameters with one or more tiles of a tile layer of a cadence instance, and
storing the first set of forecast weather parameters to a database.

30. The method of claim 29, further comprising:
reading collected weather data from a weather data source,
associating the collected weather data with a tile layer of a temporal cadence instance,
comparing the collected weather data with the first set of forecast weather parameters of a same temporal cadence instance to generate a forecast error value, and
storing the collected weather data and the forecast error values to a database.

31. The method of claim 30, further comprising:
using the forecast error value to compute a forecast adjustment,
calculating a skill metric on the basis of the forecast error value,
adjusting values of the first set of forecast weather parameters on the basis, at least in part, of one or more forecast error values, and
storing the adjusted values of the first set of forecast weather parameters to a database.

32. The method of claim 31, further comprising:
obtaining a second set of forecast weather parameters,
computing a forecast error and skill of the second set of forecast weather parameters,
blending the first set of forecast weather parameters with the second set of forecast weather parameters at least in part upon the basis of respective computed skill metrics, and
storing the blended weather forecast parameters to a database.

33. The method of claim 32, further comprising:
creating a weather product on the basis of the blended weather forecast parameters.

34. The method of claim 33, further comprising:
obtaining a second set of forecast weather parameters,
computing a forecast error and skill of the second set of forecast weather parameters,
blending the first set of forecast weather parameters with the second set of forecast weather parameters at least in part upon the basis of respective computed skill metrics, and
storing the blended weather forecast parameters to a database.

35. The method of claim 34, further comprising:
creating a weather product on the basis of the blended weather forecast parameters.

* * * * *